(12) United States Patent
Chen et al.

(10) Patent No.: US 8,509,703 B2
(45) Date of Patent: Aug. 13, 2013

(54) WIRELESS TELEPHONE WITH MULTIPLE MICROPHONES AND MULTIPLE DESCRIPTION TRANSMISSION

(75) Inventors: Juin-Hwey Chen, Irvine, CA (US); James Bennett, San Clemente, CA (US)

(73) Assignee: Broadcom Corporation, Irvine, CA (US)

(*) Notice: Subject to any disclaimer, the term of this patent is extended or adjusted under 35 U.S.C. 154(b) by 212 days.

(21) Appl. No.: 11/215,304

(22) Filed: Aug. 31, 2005

(65) Prior Publication Data
US 2006/0154623 A1      Jul. 13, 2006

Related U.S. Application Data

(63) Continuation-in-part of application No. 11/135,491, filed on May 24, 2005, which is a continuation-in-part of application No. 11/065,131, filed on Feb. 24, 2005, which is a continuation-in-part of application No. 11/018,921, filed on Dec. 22, 2004.

(51) Int. Cl.
*H04B 17/00* (2006.01)

(52) U.S. Cl.
USPC ........................................ 455/67.13

(58) Field of Classification Search
USPC ............. 455/414.4, 222, 226.2, 227.2, 569.1, 455/116, 501, 424, 425, 456.5, 456.6, 561, 455/550.1, 575.1, 3.06; 381/119, 122, 71, 381/94.1, 93, 92, 94.2, 77, 80, 94.7; 379/346, 379/202, 68, 3, 88.13, 167.14, 406.05, 420.03; 704/200, 212, 217, 218, 221; 370/332, 252, 370/268, 289, 290; 375/240.27
See application file for complete search history.

(56) References Cited

U.S. PATENT DOCUMENTS

| 3,770,911 A | 11/1973 | Knowles et al. |
|---|---|---|
| 4,658,426 A * | 4/1987 | Chabries et al. ............. 381/94.3 |

(Continued)

FOREIGN PATENT DOCUMENTS

| EP | 0 569 216 A1 | 11/1993 |
|---|---|---|
| EP | 0 661 904 A2 | 7/1995 |

OTHER PUBLICATIONS

"audio.technica. A Brief Guide to Microphones," copyright 2001 Audio-Technica U.S. Inc., 6 pages, printed on Feb. 17, 2005, printed from http://www.audio-technica.com/using/mphones/guide/pattern.html.

(Continued)

*Primary Examiner* — Ankur Jain
(74) *Attorney, Agent, or Firm* — Sterne, Kessler, Goldstein & Fox P.L.L.C.

(57) ABSTRACT

The present invention is directed to a multiple description transmission system that provides redundancy to combat transmission channel impairments. The multiple description transmission system includes a first and second wireless telephone. The first wireless telephone includes the following: an array of microphones, wherein each microphone in the array of microphones is configured to receive voice input from a user and to produce a voice signal corresponding thereto; an encoder coupled to the microphone array and configured to encode each of the voice signals; and a transmitter coupled to the encoder and configured to transmit each of the encoded voice signals. The second wireless telephone includes the following: a receiver configured to receive the transmitted signals; a decoder coupled to the receiver and configured to decode the signals received by the receiver, thereby producing an output signal; and a loudspeaker that receives the output signal and produces a pressure sound wave corresponding thereto.

18 Claims, 26 Drawing Sheets

(56) References Cited

U.S. PATENT DOCUMENTS

| | | | |
|---|---|---|---|
| 5,109,390 A | 4/1992 | Gilhousen et al. | |
| 5,125,032 A * | 6/1992 | Meister et al. | 381/72 |
| 5,233,349 A | 8/1993 | Moulsley | |
| 5,353,376 A * | 10/1994 | Oh et al. | 704/233 |
| 5,426,703 A | 6/1995 | Hamabe et al. | |
| 5,440,544 A * | 8/1995 | Zinser, Jr. | 370/319 |
| 5,546,458 A * | 8/1996 | Iwami | 379/392.01 |
| 5,581,620 A * | 12/1996 | Brandstein et al. | 381/92 |
| 5,602,962 A * | 2/1997 | Kellermann | 704/226 |
| 5,610,991 A * | 3/1997 | Janse | 381/92 |
| 5,706,282 A * | 1/1998 | Chung | 370/280 |
| 5,740,256 A * | 4/1998 | Castello Da Costa et al. | 381/94.7 |
| 5,752,226 A | 5/1998 | Chan et al. | |
| 5,754,665 A * | 5/1998 | Hosoi | 381/94.1 |
| 5,761,318 A | 6/1998 | Shimauchi et al. | |
| 5,796,819 A | 8/1998 | Romesburg | |
| 5,835,851 A * | 11/1998 | Rasmusson et al. | 455/79 |
| 5,870,681 A * | 2/1999 | Myer | 455/562.1 |
| 5,917,919 A | 6/1999 | Rosenthal | |
| 6,011,843 A * | 1/2000 | Hochman et al. | 379/211.04 |
| 6,122,610 A | 9/2000 | Isabelle | |
| 6,154,499 A | 11/2000 | Bhaskar et al. | |
| 6,163,608 A * | 12/2000 | Romesburg et al. | 379/406.01 |
| 6,219,645 B1 * | 4/2001 | Byers | 704/275 |
| 6,236,862 B1 * | 5/2001 | Erten et al. | 455/501 |
| 6,269,161 B1 | 7/2001 | McLaughlin et al. | |
| 6,339,758 B1 | 1/2002 | Kanazawa et al. | |
| 6,430,295 B1 * | 8/2002 | Handel et al. | 381/94.7 |
| 6,453,285 B1 * | 9/2002 | Anderson et al. | 704/210 |
| 6,507,653 B1 | 1/2003 | Romesburg | |
| 6,510,224 B1 | 1/2003 | Christensson et al. | |
| 6,594,367 B1 * | 7/2003 | Marash et al. | 381/92 |
| 6,647,367 B2 | 11/2003 | McArthur et al. | |
| 6,668,062 B1 * | 12/2003 | Luo et al. | 381/122 |
| 6,694,028 B1 * | 2/2004 | Matsuo | 381/92 |
| 6,707,910 B1 | 3/2004 | Valve et al. | |
| 6,717,991 B1 | 4/2004 | Gustafsson et al. | |
| 6,760,882 B1 * | 7/2004 | Catreux et al. | 714/774 |
| 6,768,979 B1 * | 7/2004 | Menendez-Pidal et al. | 704/226 |
| 6,810,273 B1 * | 10/2004 | Mattila et al. | 455/570 |
| 6,889,187 B2 * | 5/2005 | Zhang | 704/253 |
| 6,937,980 B2 * | 8/2005 | Krasny et al. | 704/231 |
| 6,952,482 B2 * | 10/2005 | Balan et al. | 381/94.1 |
| 6,963,649 B2 | 11/2005 | Vaudrey et al. | |
| 6,985,856 B2 | 1/2006 | Wang et al. | |
| 6,990,194 B2 * | 1/2006 | Mikesell et al. | 379/406.04 |
| 7,003,099 B1 | 2/2006 | Zhang et al. | |
| 7,010,134 B2 * | 3/2006 | Jensen | 381/313 |
| 7,058,185 B1 | 6/2006 | Egelmeers et al. | |
| 7,062,049 B1 | 6/2006 | Inoue et al. | |
| 7,099,821 B2 * | 8/2006 | Visser et al. | 704/226 |
| 7,116,791 B2 * | 10/2006 | Matsuo | 381/92 |
| 7,127,218 B2 * | 10/2006 | Lindenmeier | 455/101 |
| 7,146,013 B1 * | 12/2006 | Saito et al. | 381/92 |
| 7,158,764 B2 * | 1/2007 | Thayer et al. | 455/90.1 |
| 7,164,710 B2 * | 1/2007 | Komaili et al. | 375/229 |
| 7,171,246 B2 * | 1/2007 | Mattila et al. | 455/570 |
| 7,174,002 B1 | 2/2007 | Burns | |
| 7,174,022 B1 * | 2/2007 | Zhang et al. | 381/92 |
| 7,181,031 B2 * | 2/2007 | Ludvigsen | 381/312 |
| 7,181,232 B2 * | 2/2007 | Lin et al. | 455/450 |
| 7,206,418 B2 * | 4/2007 | Yang et al. | 381/92 |
| 7,286,946 B2 * | 10/2007 | Yoneda | 702/62 |
| 7,346,175 B2 | 3/2008 | Hui et al. | |
| 7,499,686 B2 | 3/2009 | Sinclair et al. | |
| 7,602,926 B2 | 10/2009 | Roovers | |
| 7,983,720 B2 | 7/2011 | Chen | |
| 2001/0034601 A1 | 10/2001 | Chujo et al. | |
| 2002/0009203 A1 * | 1/2002 | Erten | 381/92 |
| 2002/0048376 A1 * | 4/2002 | Ukita | 381/92 |
| 2002/0141601 A1 * | 10/2002 | Finn et al. | 381/92 |
| 2002/0172350 A1 | 11/2002 | Edwards et al. | |
| 2002/0172374 A1 * | 11/2002 | Bizjak | 381/71.14 |
| 2002/0193130 A1 * | 12/2002 | Yang et al. | 455/501 |
| 2003/0021389 A1 * | 1/2003 | Hirai et al. | 379/3 |
| 2003/0022648 A1 * | 1/2003 | Wight | 455/276.1 |
| 2003/0027600 A1 * | 2/2003 | Krasny et al. | 455/564 |
| 2003/0040908 A1 * | 2/2003 | Yang et al. | 704/233 |
| 2003/0044025 A1 * | 3/2003 | Ouyang et al. | 381/92 |
| 2003/0053639 A1 * | 3/2003 | Beaucoup et al. | 381/92 |
| 2003/0060219 A1 * | 3/2003 | Parsiokas | 455/501 |
| 2003/0086575 A1 * | 5/2003 | Balan et al. | 381/94.2 |
| 2003/0091182 A1 | 5/2003 | Marchok et al. | |
| 2003/0156722 A1 | 8/2003 | Taenzer | |
| 2003/0179888 A1 * | 9/2003 | Burnett et al. | 381/71.8 |
| 2003/0200092 A1 * | 10/2003 | Gao et al. | 704/258 |
| 2003/0228023 A1 * | 12/2003 | Burnett et al. | 381/92 |
| 2003/0233213 A1 * | 12/2003 | Balan et al. | 702/180 |
| 2004/0001599 A1 * | 1/2004 | Etter et al. | 381/94.1 |
| 2004/0057586 A1 * | 3/2004 | Licht | 381/94.7 |
| 2004/0086109 A1 | 5/2004 | Takada | |
| 2004/0092297 A1 * | 5/2004 | Huang | 455/575.7 |
| 2004/0152418 A1 | 8/2004 | Sinha et al. | |
| 2004/0193411 A1 | 9/2004 | Hui et al. | |
| 2006/0007994 A1 * | 1/2006 | Lai et al. | 375/227 |
| 2006/0013412 A1 | 1/2006 | Goldin | |
| 2006/0133621 A1 | 6/2006 | Chen et al. | |
| 2006/0133622 A1 | 6/2006 | Chen | |
| 2006/0135085 A1 | 6/2006 | Chen | |
| 2006/0147063 A1 * | 7/2006 | Chen | 381/119 |
| 2006/0154623 A1 * | 7/2006 | Chen et al. | 455/116 |
| 2007/0116300 A1 * | 5/2007 | Chen | 381/92 |
| 2009/0111507 A1 | 4/2009 | Chen | |
| 2009/0209290 A1 | 8/2009 | Chen et al. | |

OTHER PUBLICATIONS

"Tip #2: Microphone Polar Patterns," copyright 1999 Crown International Inc., 3 pages, printed on Dec. 30, 2004, printed from http://www.crownaudio.com/mic_htm/tips/mictip2.htm.

Iain A. McCowan, "Robust Speech Recognition using Microphone Arrays," PhD Thesis, Queensland University of Technology, pp. 1-38, Australia, 2001.

Chen, J.H., U.S. Appl. No. 11/976,995, filed Oct. 30, 2007, entitled "Speech Intelligibility in Telephones with Multiple Microphones".

International Search Report for counterpart European Patent Appl. No. 05022377.5, dated May 10, 2006, 3 pages.

International Search Report for counterpart European Patent Appl. No. 05026022.3, dated May 10, 2006, 4 pages.

Kerem, S., "Dual Microphones Separate Voice From Noise," EDN Electrical Design News, Reed Business Information, Highlands Ranch, CO, us, vol. 39, No. 13, Jun. 23, 1994, p. 82.

Examination Report, dated Oct. 11, 2007, for counterpart European Patent Appl. No. 05022377.5, 4 pages.

Final Office Action and Notice of References Cited for U.S. Appl. No. 11/018,921, dated Mar. 18, 2009, 22 pages.

Non-Final Office Action and Notice of References Cited for U.S. Appl. No. 11/018,921, dated Oct. 29, 2008, 19 pages.

Non-Final Office Action and Notice of References Cited for U.S. Appl. No. 11/065,131, dated Dec. 24, 2008, 13 pages.

Non-Final Office Action and Notice of References Cited for U.S. Appl. No. 11/065,131, dated Jun. 18, 2008, 13 pages.

Non-Final Office Action and Notice of References Cited for U.S. Appl. No. 11/065,131, dated May 18, 2007, 13 pages.

Non-Final Office Action and Notice of References Cited for U.S. Appl. No. 11/065,131, dated Nov. 2, 2007, 12 pages.

Non-Final Office Action and Notice of References Cited for U.S. Appl. No. 11/135,491, dated Dec. 8, 2008, 11 pages.

Non-Final Office Action and Notice of References Cited for U.S. Appl. No. 11/135,491, dated Jun. 9, 2008, 9 pages.

Non-Final Office Action and Notice of References Cited for U.S. Appl. No. 11/135,491, dated Nov. 2, 2007, 11 pages.

Amendment and Reply Under 37 C.F.R. § 1.111 as filed in U.S. Appl. No. 11/065,131 on Aug. 20, 2007 (18 pages).

D.L. Freeman et al., "The Voice Activity Detector for the Pan-European Digital Cellular Mobile Telephone Service", 1989, IEEE. CH2676-2/89/0000-0369. p. 369-373.

Final Office Action and Notice of References Cited for U.S. Appl. No. 11/135,491, dated May 18, 2009, 11 pages.

Non-Final Rejection mailed Jul. 23, 2009 for U.S. Appl. No. 11/018,921, filed Dec. 22, 2004; 21 pages.
Final Rejection mailed Aug. 6, 2009 for U.S. Appl. No. 11/065,131, filed Feb. 24, 2005; 16 pages.
Non-Final Rejection mailed Dec. 10, 2009 for U.S. Appl. No. 11/065,131, filed Feb. 24, 2005; 16 pages.
Non-Final Rejection mailed Oct. 28, 2009 for U.S. Appl. No. 11/135,491, filed May 24, 2005; 11 pages.
Notice of Allowance mailed May 11, 2009 for U.S. Appl. No. 11/135,491, filed May 24, 2005; 9 pages.
Notice of Allowance mailed Aug. 26, 2010 for U.S. Appl. No. 11/135,491, filed May 24, 2005; 10 pages.
Notice of Allowance mailed Mar. 11, 2011 for U.S. Appl. No. 11/135,491, filed May 24, 2005; 10 pages.
Non-Final Rejection mailed Aug. 3, 2010 for U.S. Appl. No. 11/239,351, filed Sep. 30, 2005; 16 pages.
Final Rejection mailed Mar. 4, 2011 for U.S. Appl. No. 11/239,351, filed Sep. 30, 2005; 16 pages.
Non-Final Rejection mailed Mar. 22, 2010 for U.S. Appl. No. 11/653,858, filed Jan. 17, 2007; 15 pages.
Final Rejection mailed Oct. 28, 2010 for U.S. Appl. No. 11/653,858, filed Jan. 17, 2007; 18 pages.
Non-Final Rejection mailed Sep. 9, 2010 for U.S. Appl. No. 11/976,995, filed Oct. 30, 2007; 12 pages.
Non-Final Rejection mailed Mar. 18, 2011 for U.S. Appl. No. 11/976,995, filed Oct. 30, 2007; 9 pages.
Final Rejection mailed Aug. 17, 2011 for U.S. Appl. No. 11/976,995, filed Oct. 30, 2007; 6 pages.
Non-Final Rejection mailed Sep. 2, 2010 for U.S. Appl. No. 12/432,302, filed Apr. 29, 2009; 13 pages.
Final Rejection mailed Apr. 13, 2011 for U.S. Appl. No. 12/432,302, filed Apr. 29, 2009; 17 pages.
Ramamoorthy, V., "Speech Coding Using Modulo-PCM with Side Information", IEEE International Conference on Acoustics, Speech, and Signal Processing, 1981; pp. 832-835.
Non-Final Rejection mailed Oct. 7, 2011 for U.S. Appl. No. 12/432,302, filed Apr. 29, 2009; 10 pages.
Official Office Action for CN Application No. 2006100841214, dated Aug. 29, 2008, 7 pages.
Warsitz, E. et al., "Speech Enhancement with a New Generalized Eigenvector Blocking Matrix for Application in a Generalized Sidelobe Canceller," IEEE International Conference on Acoustics, Speech, and Signal Processing, 2008; pp. 73-76
Non-Final Rejection mailed Feb. 28, 2012 for U.S. Appl. No. 11/239,351, filed Sep. 30, 2005; 11 pages.
Non-Final Rejection mailed Nov. 9, 2011 for U.S. Appl. No. 11/653,858, filed Jan. 17, 2007; 17 pages.
USPTO Communication faxed Mar. 2, 2012 for U.S. Appl. No. 11/653,858, filed Jan. 17, 2007; 4 pages.
Final Rejection mailed Apr. 3, 2012 for U.S. Appl. No. 11/653,858, filed Jan. 17, 2007; 25 pages.
Notice of Allowance mailed Oct. 12, 2011 for U.S. Appl. No. 11/976,995, filed Oct. 30, 2007; 5 pages.
Non-Final Rejection mailed Apr. 4, 2012 for U.S. Appl. No. 12/432,302, filed Apr. 29, 2009; 12 pages.
Non-Final Rejection mailed Oct. 31, 2012 for U.S. Appl. No. 12/432,302, filed Apr. 29, 2009; 16 pages.
Office Action directed to related Taiwanese Patent Application No. 095118220, mailed Dec. 20, 2011; 7 pages.
Non-Final Office Action mailed Nov. 21, 2012 for U.S. Appl. No. 11/239,351, filed Sep. 30, 2005; 12 pages.

* cited by examiner

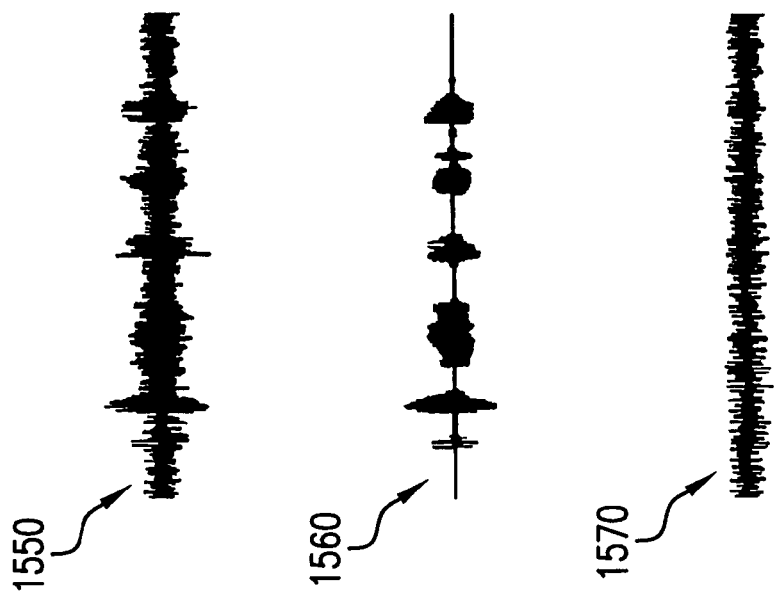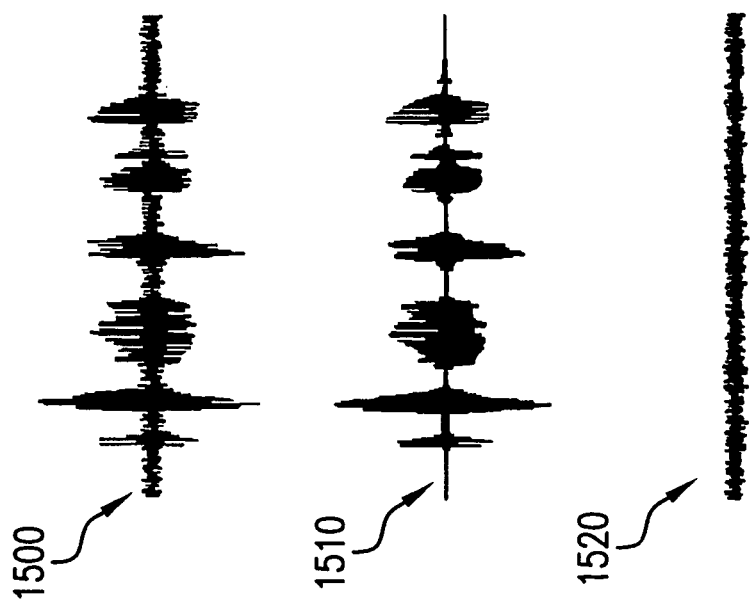
FIG. 15

(a) $L/\lambda=0.5$ (b) $L/\lambda=1$ (c) $L/\lambda=2$ (d) $L/\lambda=4$

WIRELESS TELEPHONE WITH MULTIPLE MICROPHONES AND MULTIPLE DESCRIPTION TRANSMISSION

CROSS REFERENCE TO RELATED APPLICATIONS

This application is a continuation-in-part of U.S. patent application Ser. No. 11/135,491 to Chen, entitled "Wireless Telephone with Adaptive Microphone Array" and filed May 24, 2005, which is a continuation-in-part of U.S. patent application Ser. No. 11/065,131 to Chen, entitled "Wireless Telephone With Uni-Directional and Omni-Directional Microphones" and filed Feb. 24, 2005, which is a continuation-in-part of U.S. patent application Ser. No. 11/018,921 to Chen et al., entitled "Wireless Telephone Having Multiple Microphones" and filed Dec. 22, 2004. The entirety of each of these applications is hereby incorporated by reference as if fully set forth herein.

BACKGROUND

1. Field

The present invention relates generally to wireless telecommunication devices, and in particular to wireless telephones.

2. Background

Background noise is an inherent problem in wireless telephone communication. Conventional wireless telephones include a single microphone that receives a near-end user's voice and outputs a corresponding audio signal for subsequent encoding and transmission to the telephone of a far-end user. However, the audio signal output by this microphone typically includes both a voice component and a background noise component. As a result, the far-end user often has difficulty deciphering the desired voice component against the din of the embedded background noise component.

Conventional wireless telephones often include a noise suppressor to reduce the detrimental effects of background noise. A noise suppressor attempts to reduce the level of the background noise by processing the audio signal output by the microphone through various algorithms. These algorithms attempt to differentiate between a voice component of the audio signal and a background noise component of the audio signal, and then attenuate the level of the background noise component.

Conventional wireless telephones often also include a voice activity detector (VAD) that attempts to identify and transmit only those portions of the audio signal that include a voice component. One benefit of VAD is that bandwidth is conserved on the telecommunication network because only selected portions of the audio signal are transmitted.

In order to operate effectively, both the noise suppressor and the VAD must be able to differentiate between the voice component and the background noise component of the input audio signal. However, in practice, differentiating the voice component from the background noise component is difficult.

In addition to background noise, transmission channel impairments can degrade the quality of an audio signal. For example, the audio signal encoded and transmitted by the near-end user's wireless telephone may be corrupted by transmission channel impairments, and this may cause quality degradation of the audio signal received and decoded by the far-end user's wireless telephone. In this example, the near-end user's wireless telephone cannot, by itself, remedy all the adverse effects of transmission channel impairments.

What is needed then, is a wireless telephone that better mitigates the effect of background noise present in an input audio signal as compared to conventional wireless telephones, and a transmission system that provides redundancy to combat transmission channel impairments.

BRIEF SUMMARY

The present invention is directed to a wireless telephone with multiple microphones and a multiple description transmission system that provides redundancy to combat transmission channel impairments. The multiple description transmission system includes a first and second wireless telephone. The first wireless telephone comprises an array of microphones, an encoder, and a transmitter. Each microphone in the array of microphones is configured to receive voice input from a user and to produce a voice signal corresponding thereto. The encoder is coupled to the microphone array and configured to encode each of the voice signals. The transmitter is coupled to the encoder and configured to transmit each of the encoded voice signals. The second wireless telephone comprises a receiver, a decoder, and a speaker. The receiver is configured to receive the transmitted signals. The decoder is coupled to the receiver and configured to decode the signals received by the receiver, thereby producing an output signal. The speaker receives the output signal and produces a pressure sound wave corresponding thereto.

In a first embodiment of the present invention, the decoder is further configured to time-align the signals received by the receiver and to combine the time-aligned signals to produce the output signal, whereby the output signal has a higher signal-to-noise ratio than any of the transmitted signals received by the receiver.

In a second embodiment of the present invention, the decoder is further configured to (i) detect a direction of arrival (DOA) of a sound wave emanating from the mouth of a user of the first wireless telephone based on the signals received by the receiver of the second wireless telephone and (ii) adaptively combine the received signals based on the DOA to produce the output signal. In addition, the decoder is still further configured to adaptively combine the received signals based on the DOA to effectively steer a maximum sensitivity angle of the microphone array of the first wireless telephone so that the mouth of the user of the first wireless telephone is within the maximum sensitivity angle, wherein the maximum sensitivity angle is defined as an angle within which a sensitivity of the microphone array is above a threshold.

In a third embodiment of the present invention, for each voice frame of the received signals, the decoder is further configured to estimate channel impairments (e.g., signal-to-noise ratio of the channel, bit errors, and frame loss) and decode a received signal with the least channel impairments, thereby producing the output signal for the respective voice frames.

In a fourth embodiment of the present invention, for each voice frame of the received signals, the decoder is further configured to estimate channel impairments and dynamically discard those received signals having a channel impairment worse than a threshold. The decoder is still further configured to combine the non-discarded received signals according to either the first or second embodiment mentioned above.

In a fifth embodiment of the present invention, the encoder of the first wireless telephone is configured to encode the voice signals at different bit rates. For example, the encoder can be configured to encode one of the voice signals at a first bit rate (a main channel) and each of the other voice signals at a bit rate different from the first bit rate (auxiliary channels).

The main and auxiliary channels are then transmitted and decoded at the decoder of the second wireless telephone according to one of the following two examples.

In a first example, for each voice frame of the transmitted signals, the decoder of the second wireless telephone is configured to estimate channel impairments. If (i) the main channel is corrupted by channel impairments, and if (ii) at least one of the auxiliary channels is not corrupted by channel impairments, then the decoder is further configured to decode one of the auxiliary channels to produce the output signal.

In a second example, for each voice frame of the transmitted signals, the decoder is configured to estimate channel impairments. If (i) side information (e.g., the filter coefficients, the pitch period and/or the gain) of the main channel is corrupted by channel impairments, and if (ii) corresponding side information of at least one of the auxiliary channels is not corrupted by channel impairments, then the decoder can use both the main channel and one of the auxiliary channels to improve performance of a frame erasure concealment algorithm in the production of the output signal.

Further embodiments and features of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 15 shows exemplary plots depicting a voice component and a background noise component output by first and second microphones of a wireless telephone, in accordance with an embodiment of the present invention.

FIGS. 22A-D show exemplary polar patterns of a microphone array.

Figure 22A:
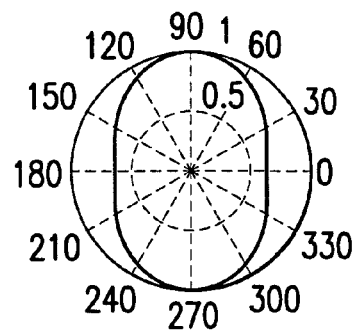
Figure 22B:
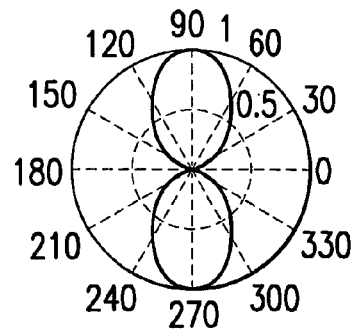
Figure 22C:
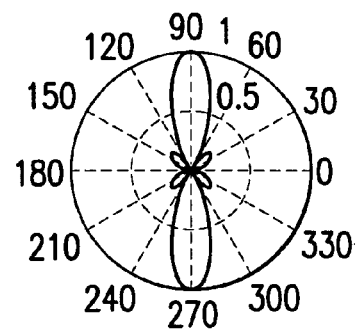
Figure 22D:
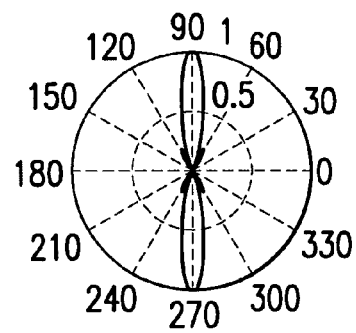
Figure 22E:
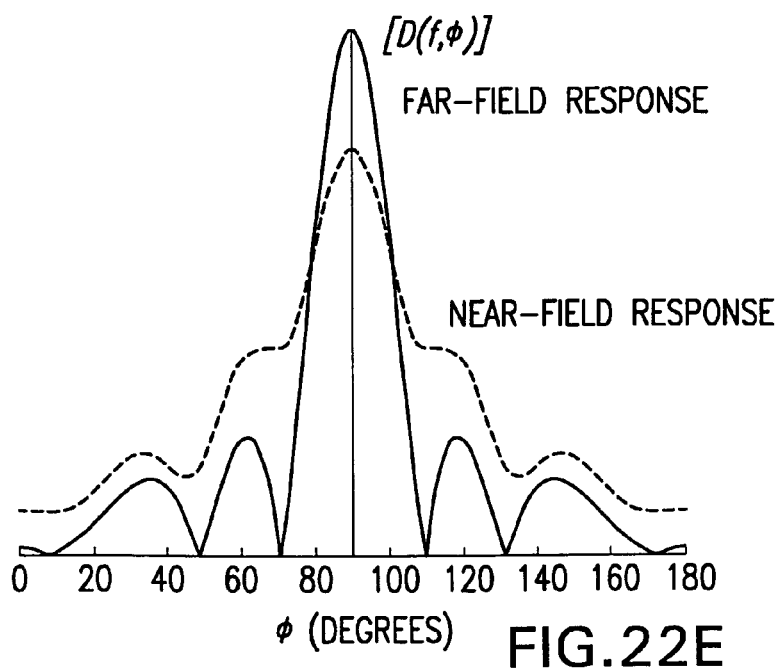

FIG. 22E shows exemplary directivity patterns of a far-field and a near-field response.

Figure 23:
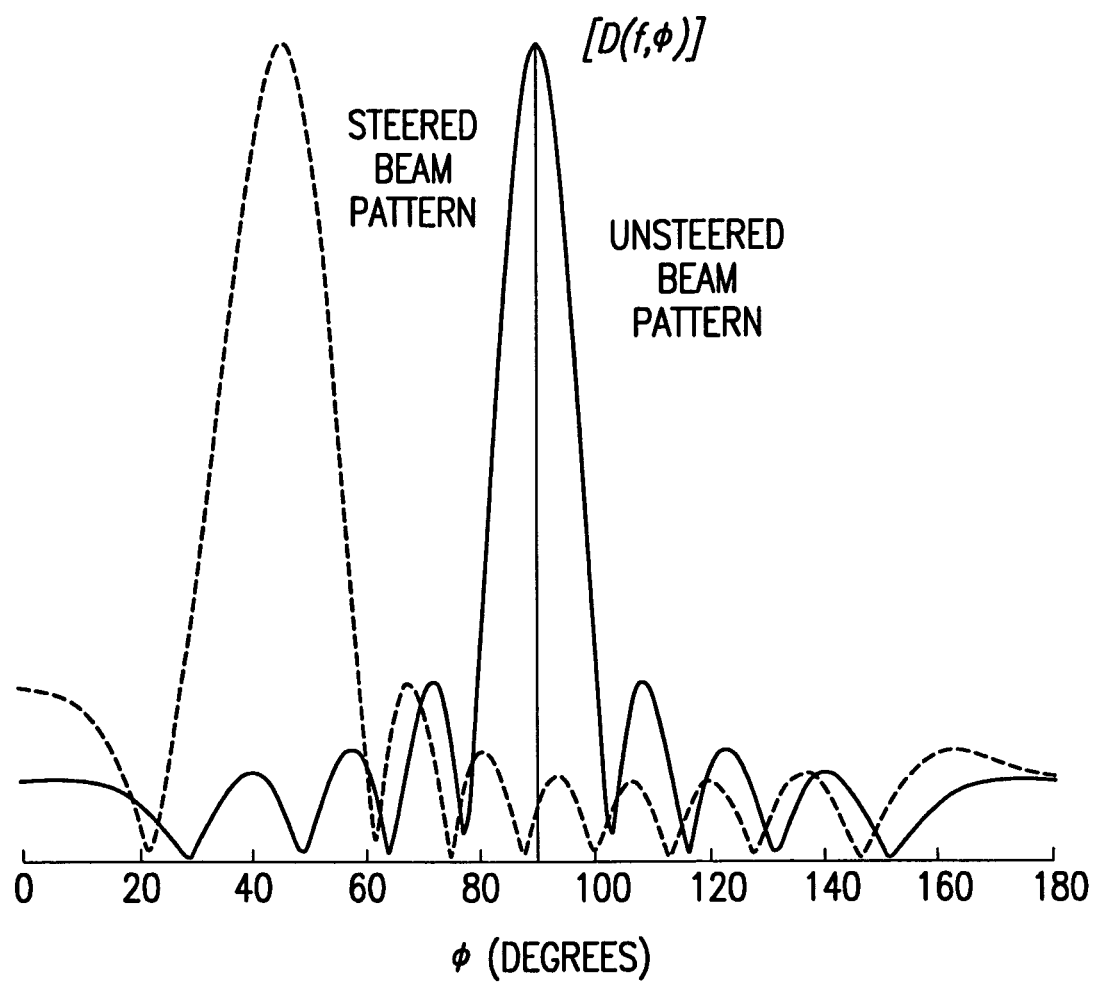

FIG. 23 shows exemplary steered and unsteered directivity patterns.

Figure 24:
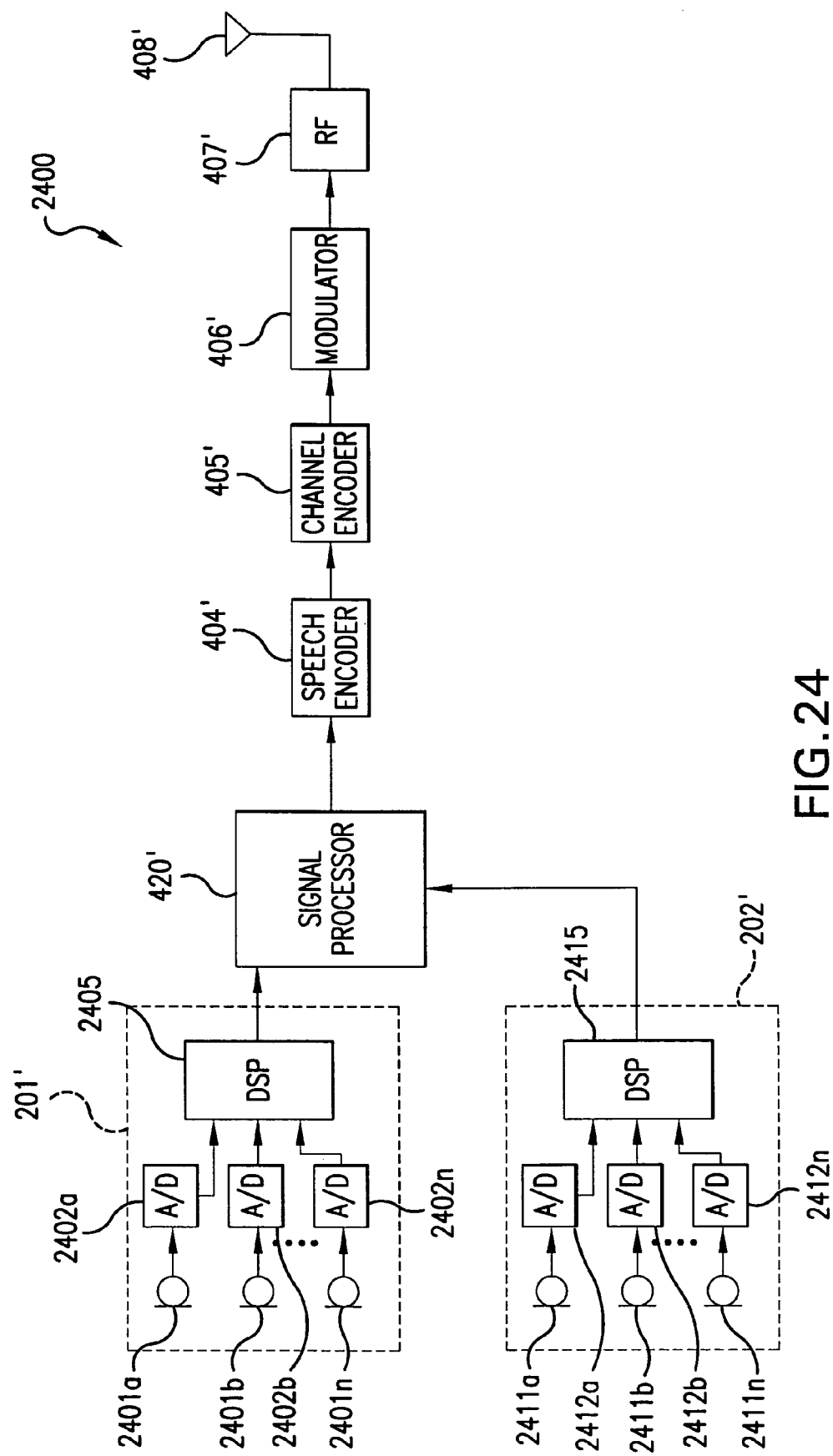

FIG. 24 is a functional block diagram of a transmit path of a wireless telephone in accordance with an embodiment of the present invention.

Figure 25:
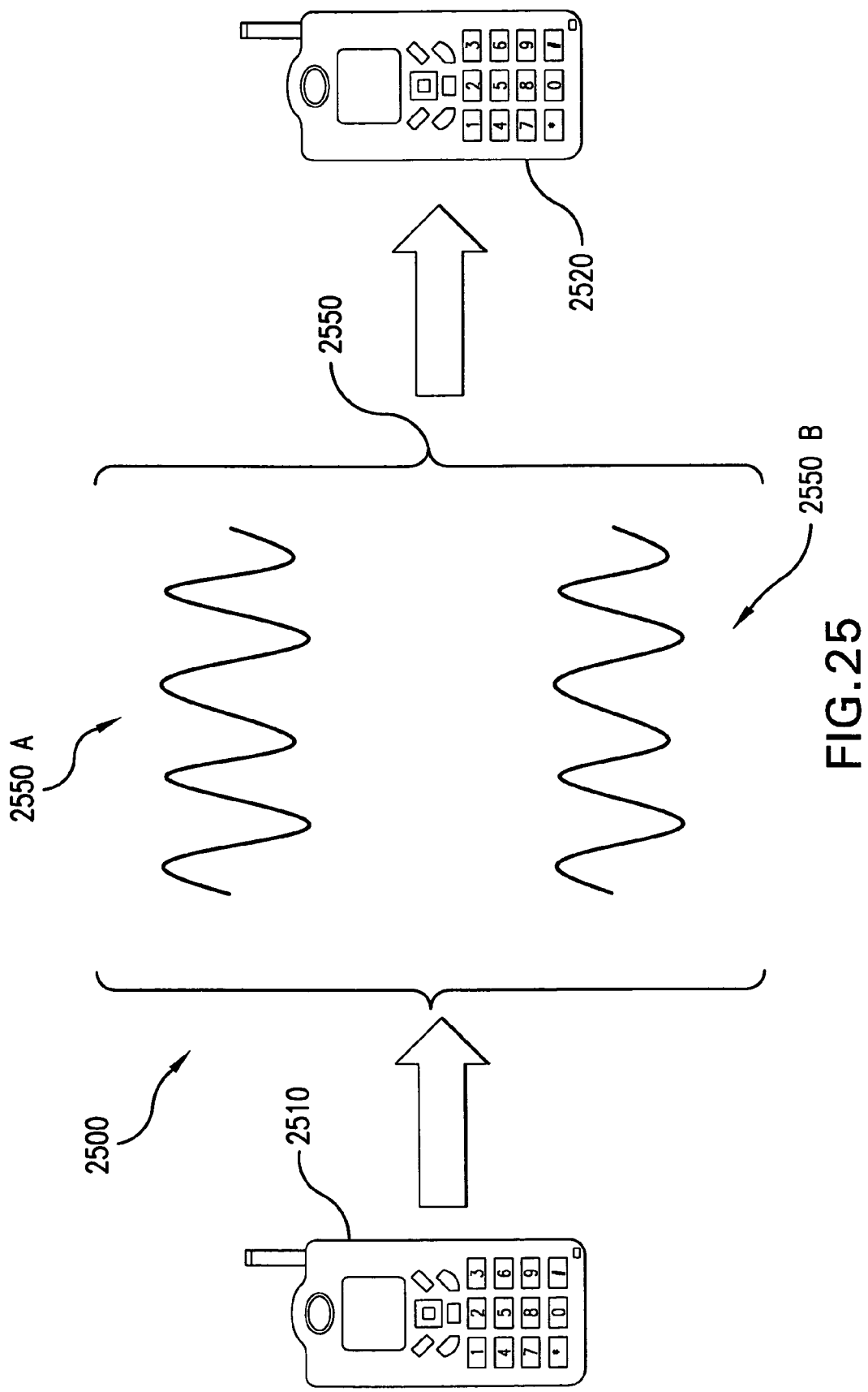

FIG. 25 illustrates a multiple description transmission system in accordance with an embodiment of the present invention.

Figure 26:
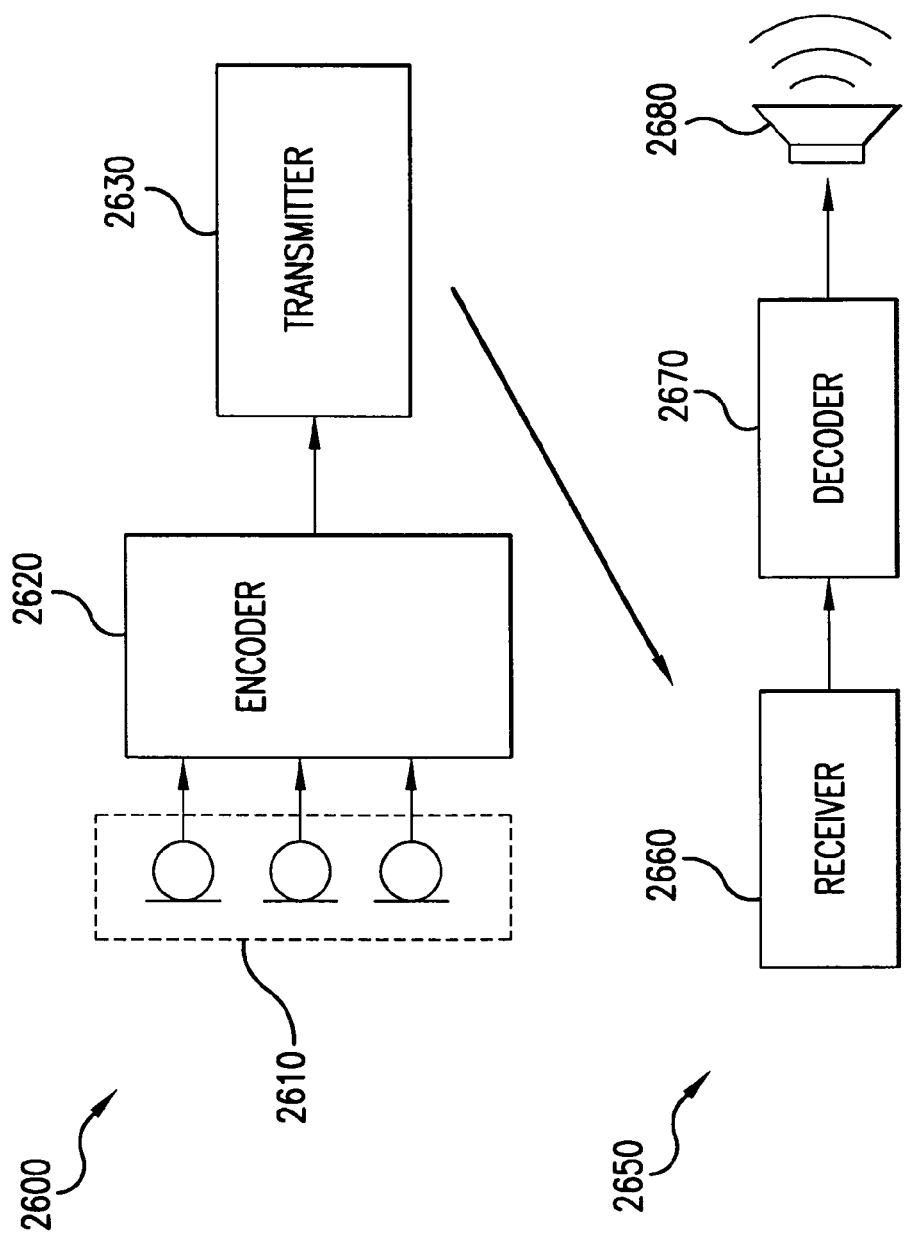

FIG. 26 is a functional block diagram of a transmit path of a wireless telephone that can be used in a multiple description transmission system in accordance with an embodiment of the present invention.

Figure 27:
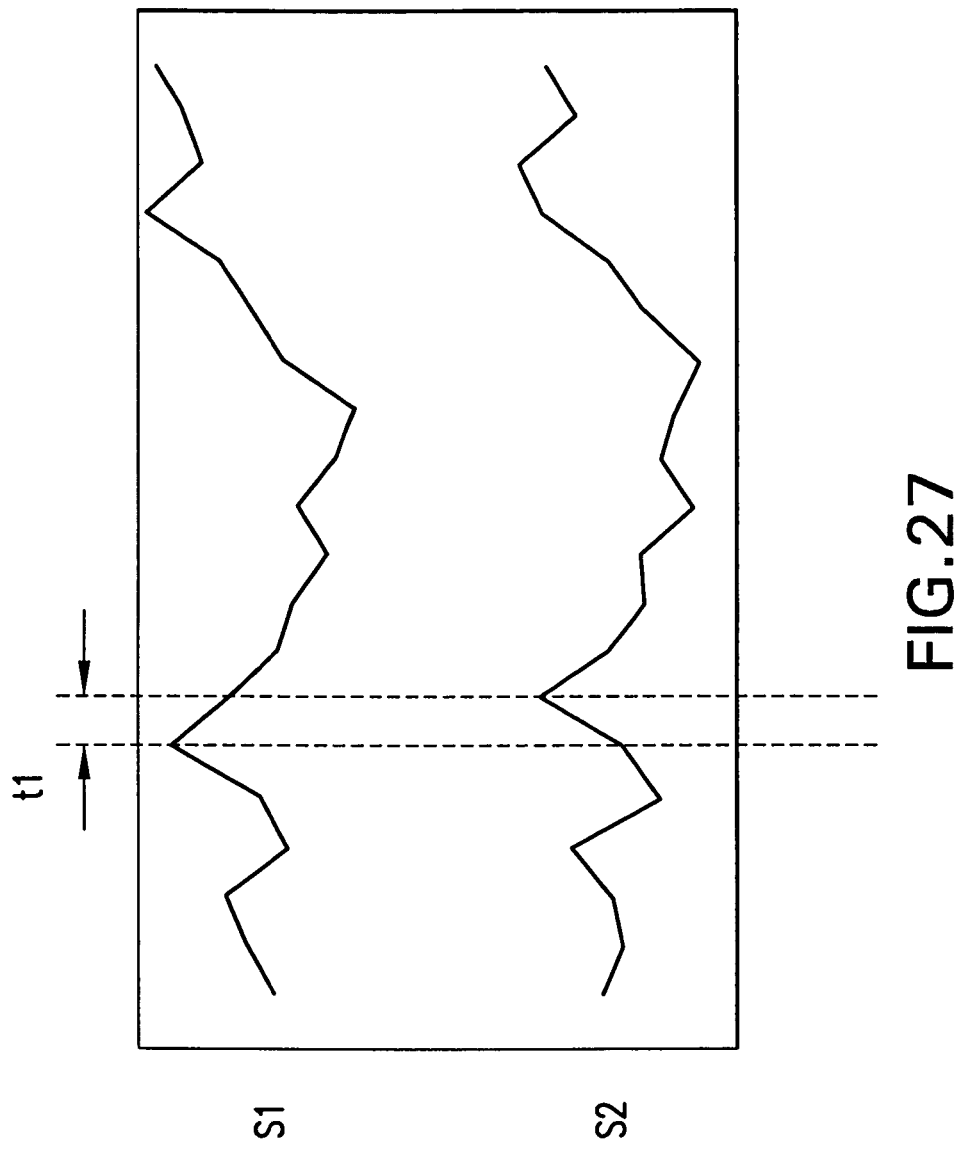

FIG. 27 illustrates multiple versions of a voice signal transmitted by a first wireless telephone in accordance with an embodiment of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

The present invention provides a wireless telephone implemented with multiple microphones and a multiple description transmission system. As will be described in more detail herein, the multiple description transmission system provides redundancy to combat transmission channel impairments.

The detailed description of the invention is divided into ten subsections. In subsection I, an overview of the workings of a conventional wireless telephone are discussed. This discussion facilitates the description of embodiments of the present invention. In subsection II, an overview of a wireless telephone implemented with a first microphone and second microphone is presented. In subsection III, an embodiment is described in which the output of the second microphone is used to cancel a background noise component output by the first microphone. In subsection IV, another embodiment is described in which the output of the second microphone is used to suppress a background noise component output by the first microphone. In subsection V, a further embodiment is discussed in which the output of the second microphone is used to improve VAD technology incorporated in the wireless telephone. In subsection VI, alternative arrangements of the present invention are discussed. In subsection VII, example uni-directional microphones are discussed. In subsection VIII, example microphone arrays are discussed. In subsection IX, a wireless telephone implemented with at least one microphone array is described. In subsection X, a multiple description transmission system in accordance with embodiments of the present invention is described.

I. Overview of Signal Processing within Conventional Wireless Telephones

Conventional wireless telephones use what is commonly referred to as encoder/decoder technology. The transmit path of a wireless telephone encodes an audio signal picked up by a microphone onboard the wireless telephone. The encoded audio signal is then transmitted to another telephone. The receive path of a wireless telephone receives signals transmitted from other wireless telephones. The received signals are then decoded into a format that an end user can understand.

Figure 1A:
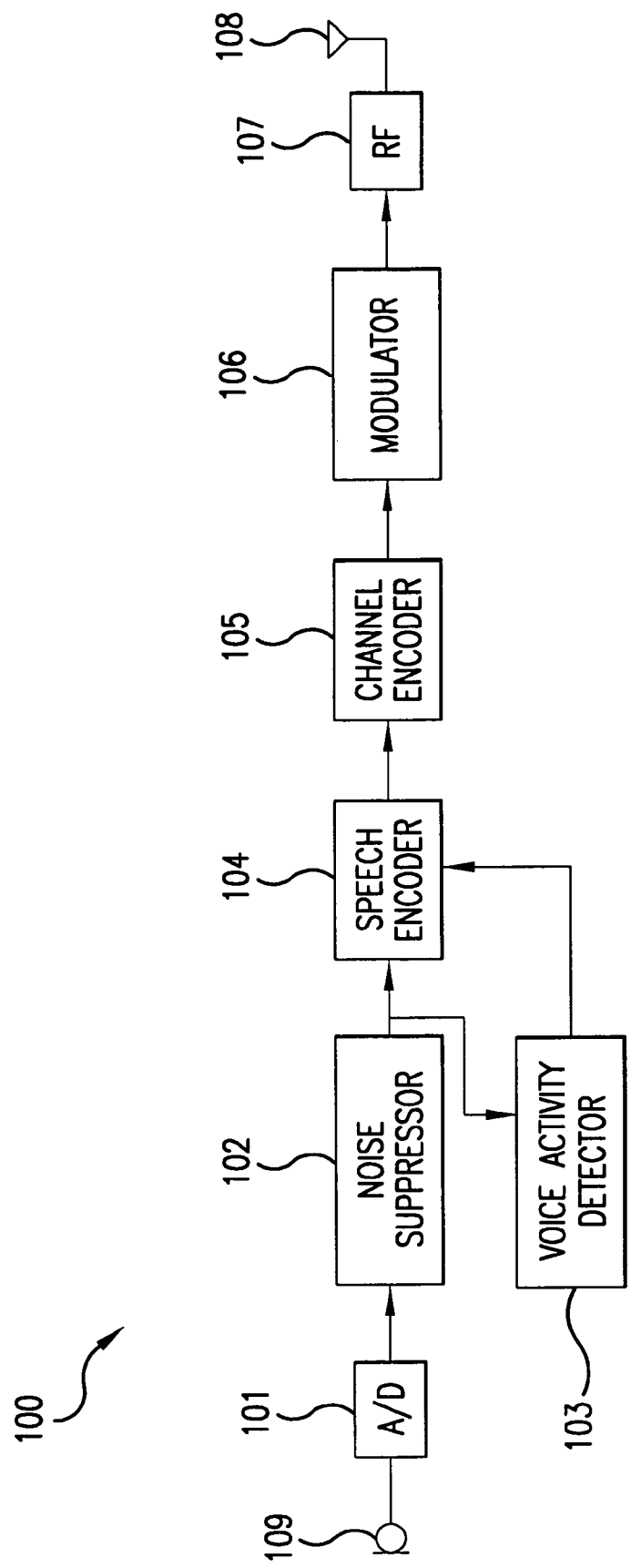
FIG. 1A is a functional block diagram of the transmit path of a conventional wireless telephone.

FIG. 1A is a functional block diagram of a typical transmit path 100 of a conventional digital wireless telephone. Transmit path 100 includes a microphone 109, an analog-to-digital (A/D) converter 101, a noise suppressor 102, a voice activity detector (VAD) 103, a speech encoder 104, a channel encoder 105, a modulator 106, a radio frequency (RF) module 107, and an antenna 108.

Microphone 109 receives a near-end user's voice and outputs a corresponding audio signal, which typically includes both a voice component and a background noise component. The A/D converter 101 converts the audio signal from an analog to a digital form. The audio signal is next processed through noise suppressor 102. Noise suppressor 102 uses various algorithms, known to persons skilled in the pertinent art, to suppress the level of embedded background noise that is present in the audio signal.

Speech encoder 104 converts the output of noise suppressor 102 into a channel index. The particular format that speech encoder 104 uses to encode the signal is dependent upon the type of technology being used. For example, the signal may be encoded in formats that comply with GSM (Global Standard for Mobile Communication), CDMA (Code Division Multiple Access), or other technologies commonly used for telecommunication. These different encoding formats are known to persons skilled in the relevant art and for the sake of brevity are not discussed in further detail.

As shown in FIG. 1A, VAD 103 also receives the output of noise suppressor 102. VAD 103 uses algorithms known to persons skilled in the pertinent art to analyze the audio signal output by noise suppressor 102 and determine when the user is speaking. VAD 103 typically operates on a frame-by-frame basis to generate a signal that indicates whether or not a frame includes voice content. This signal is provided to speech encoder 104, which uses the signal to determine how best to process the frame. For example, if VAD 103 indicates that a frame does not include voice content, speech encoder 103 may skip the encoding of the frame entirely.

Channel encoder 105 is employed to reduce bit errors that can occur after the signal is processed through the speech encoder 104. That is, channel encoder 105 makes the signal more robust by adding redundant bits to the signal. For example, in a wireless phone implementing the original GSM technology, a typical bit rate at the output of the speech encoder might be about 13 kilobits (kb) per second, whereas, a typical bit rate at the output of the channel encoder might be about 22 kb/sec. The extra bits that are present in the signal after channel encoding do not carry information about the speech; they just make the signal more robust, which helps reduce the bit errors.

The modulator 106 combines the digital signals from the channel encoder into symbols, which become an analog wave form. Finally, RF module 107 translates the analog wave forms into radio frequencies, and then transmits the RF signal via antenna 108 to another telephone.

Figure 1B:
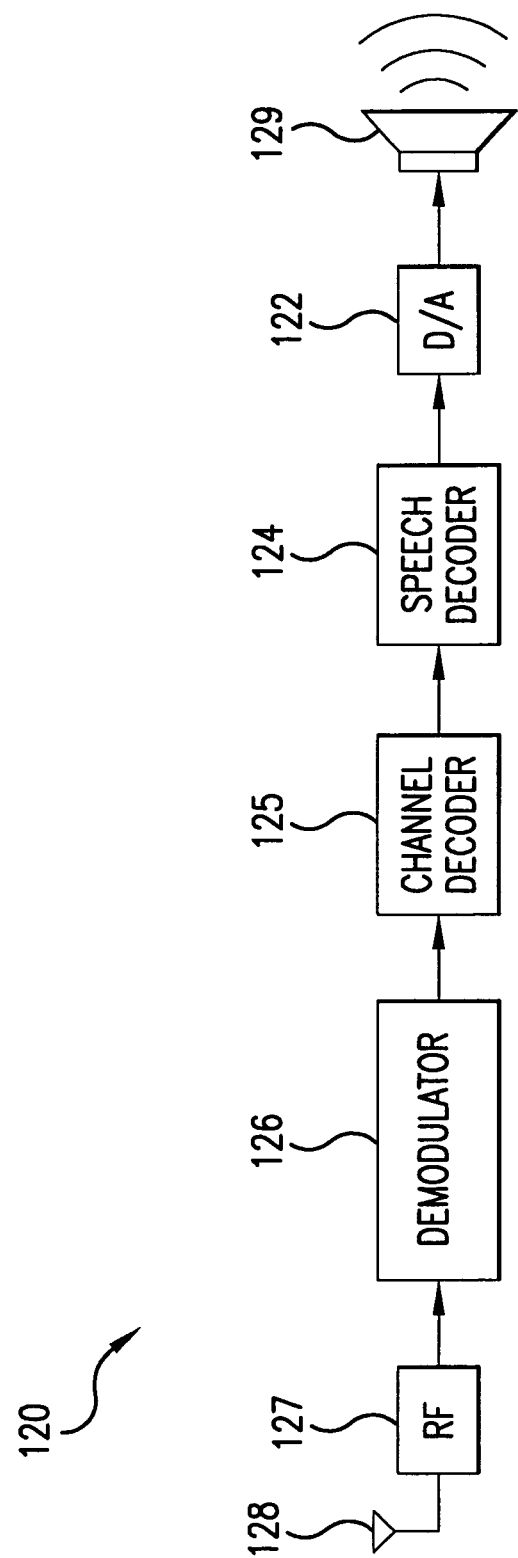
FIG. 1B is a functional block diagram of the receive path of a conventional wireless telephone.

FIG. 1B is a functional block diagram of a typical receive path 120 of a conventional wireless telephone. Receive path 120 processes an incoming signal in almost exactly the reverse fashion as compared to transmit path 100. As shown in FIG. 1B, receive path 120 includes an antenna 128, an RF module 127, a channel decoder 125, a speech decoder 124, a digital to analog (D/A) converter 122, and a speaker 129.

During operation, an analog input signal is received by antenna 128 and RF module 127 translates the radio frequencies into baseband frequencies. Demodulator 126 converts the analog waveforms back into a digital signal. Channel decoder 125 decodes the digital signal back into the channel index, which speech decoder 124 converts back into digitized speech. D/A converter 122 converts the digitized speech into analog speech. Lastly, speaker 129 converts the analog speech signal into a sound pressure wave so that it can be heard by an end user.

II. Overview of a Wireless Telephone Having Two Microphones in Accordance with the Present Invention A wireless telephone in accordance with an embodiment of the present invention includes a first microphone and a second microphone. As mentioned above and as will be described in more detail herein, an audio signal output by the second microphone can be used to improve the quality of an audio signal output by the first microphone or to support improved VAD technology.

Figure 2:
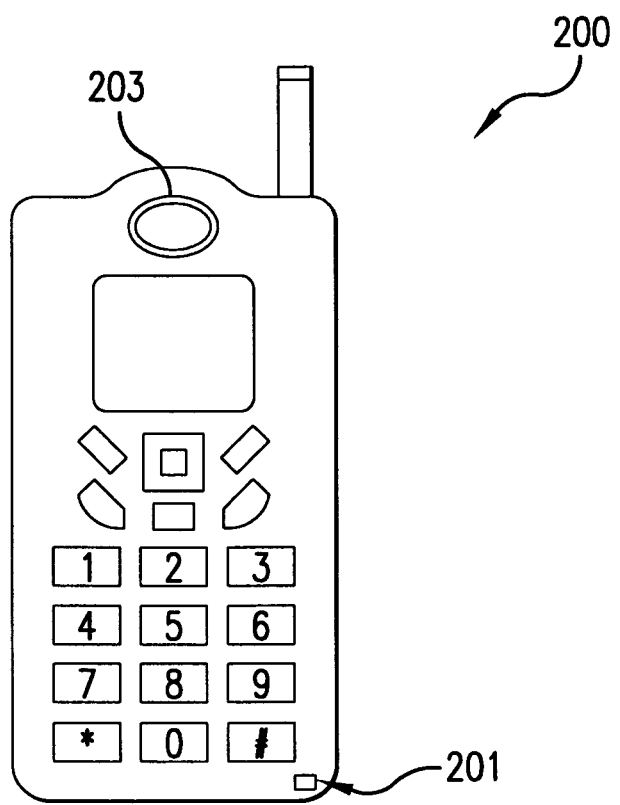
FIG. 2 is a schematic representation of the front portion of a wireless telephone in accordance with an embodiment of the present invention.
Figure 3:
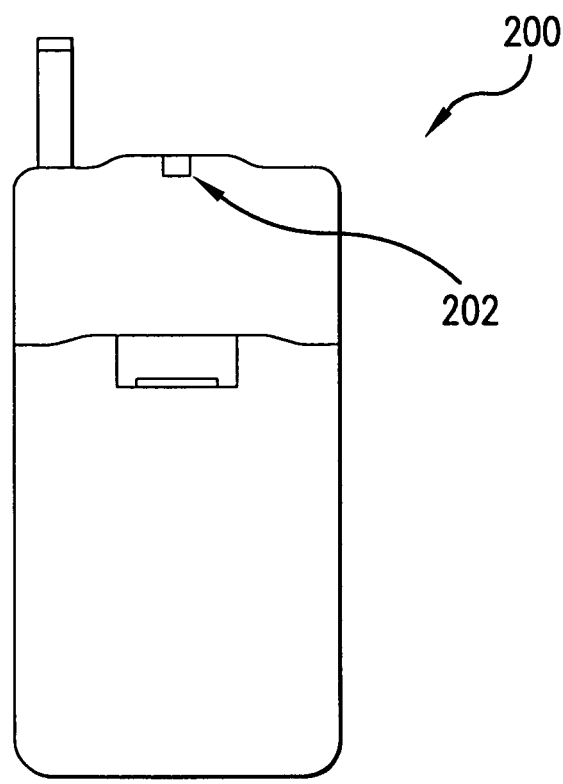
FIG. 3 is a schematic representation of the back portion of a wireless telephone in accordance with an embodiment of the present invention.

FIGS. 2 and 3 illustrate front and back portions, respectively, of a wireless telephone 200 in accordance with an embodiment of the present invention. As shown in FIG. 2, the front portion of wireless telephone 200 includes a first microphone 201 and a speaker 203 located thereon. First microphone 201 is located so as to be close to a user's mouth during regular use of wireless telephone 200. Speaker 203 is located so as to be close to a user's ear during regular use of wireless telephone 200.

As shown in FIG. 3, second microphone 202 is located on the back portion of wireless telephone 200. Second microphone 202 is located so as to be further away from a user's mouth during regular use than first microphone 201, and preferably is located to be as far away from the user's mouth during regular use as possible.

By mounting first microphone 201 so that it is closer to a user's mouth than second microphone 202 during regular use, the amplitude of the user's voice as picked up by the first microphone 201 will likely be greater than the amplitude of the user's voice as picked up by second microphone 202. Similarly, by so mounting first microphone 201 and second microphone 202, the amplitude of any background noise picked up by second microphone 202 will likely be greater than the amplitude of the background noise picked up by first microphone 201. The manner in which the signals generated by first microphone 201 and second microphone 202 are utilized by wireless telephone 200 will be described in more detail below.

FIGS. 2 and 3 show an embodiment in which first and second microphones 201 and 202 are mounted on the front and back portion of a wireless telephone, respectively. However, the invention is not limited to this embodiment and the first and second microphones may be located in other locations on a wireless telephone and still be within the scope of the present invention. For performance reasons, however, it is preferable that the first and second microphone be mounted so that the first microphone is closer to the mouth of a user than the second microphone during regular use of the wireless telephone.

Figure 4:
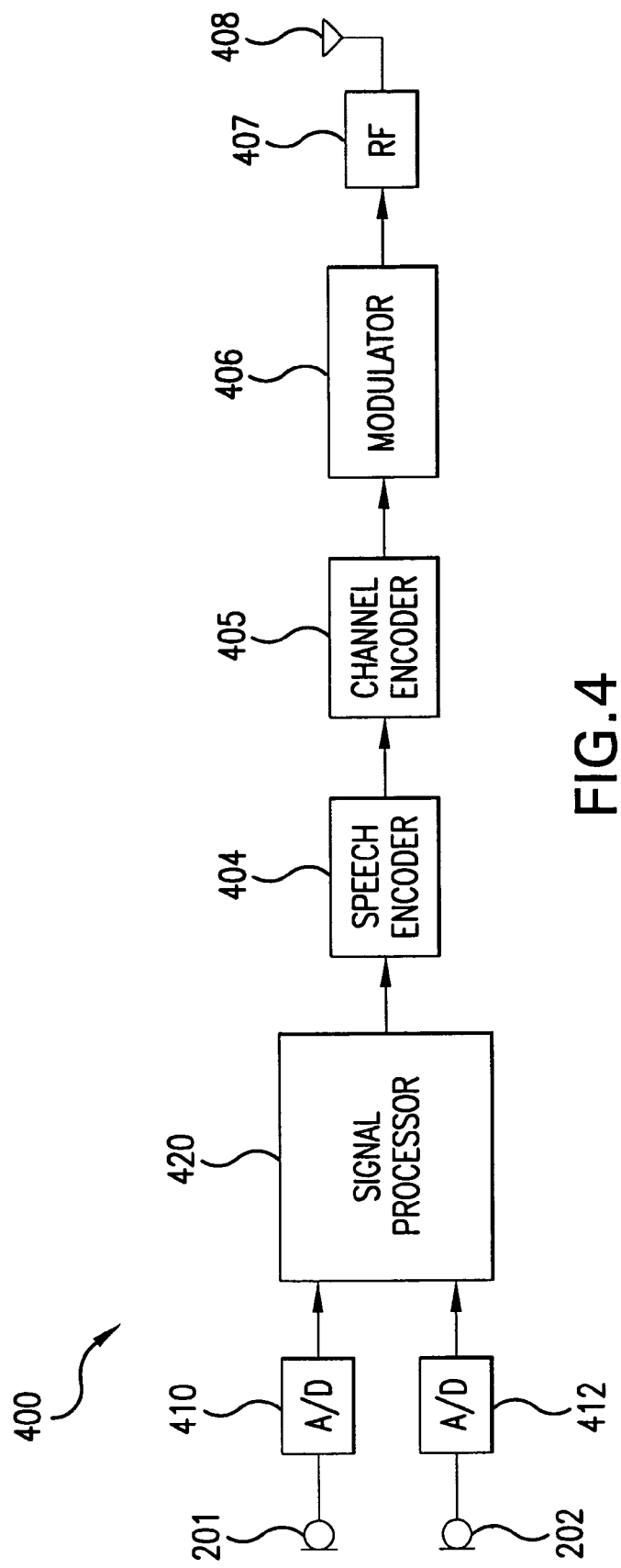
FIG. 4 is a functional block diagram of a transmit path of a wireless telephone in accordance with an embodiment of the present invention.

FIG. 4 is a functional block diagram of a transmit path 400 of a wireless telephone that is implemented with a first microphone and a second microphone in accordance with an embodiment of the present invention. Transmit path 400 includes a first microphone 201 and a second microphone 202, and a first A/D converter 410 and a second A/D converter 412. In addition, transmit path 400 includes a signal processor 420, a speech encoder 404, a channel encoder 405, a modulator 406, an RF module 407, and an antenna 408. Speech encoder 404, channel encoder 405, modulator 406, RF module 407, and antenna 408 are respectively analogous to speech encoder 104, channel encoder 105, modulator 106, RF module 107, and antenna 108 discussed with reference to transmit path 100 of FIG. 1A and thus their operation will not be discussed in detail below.

Figure 5:
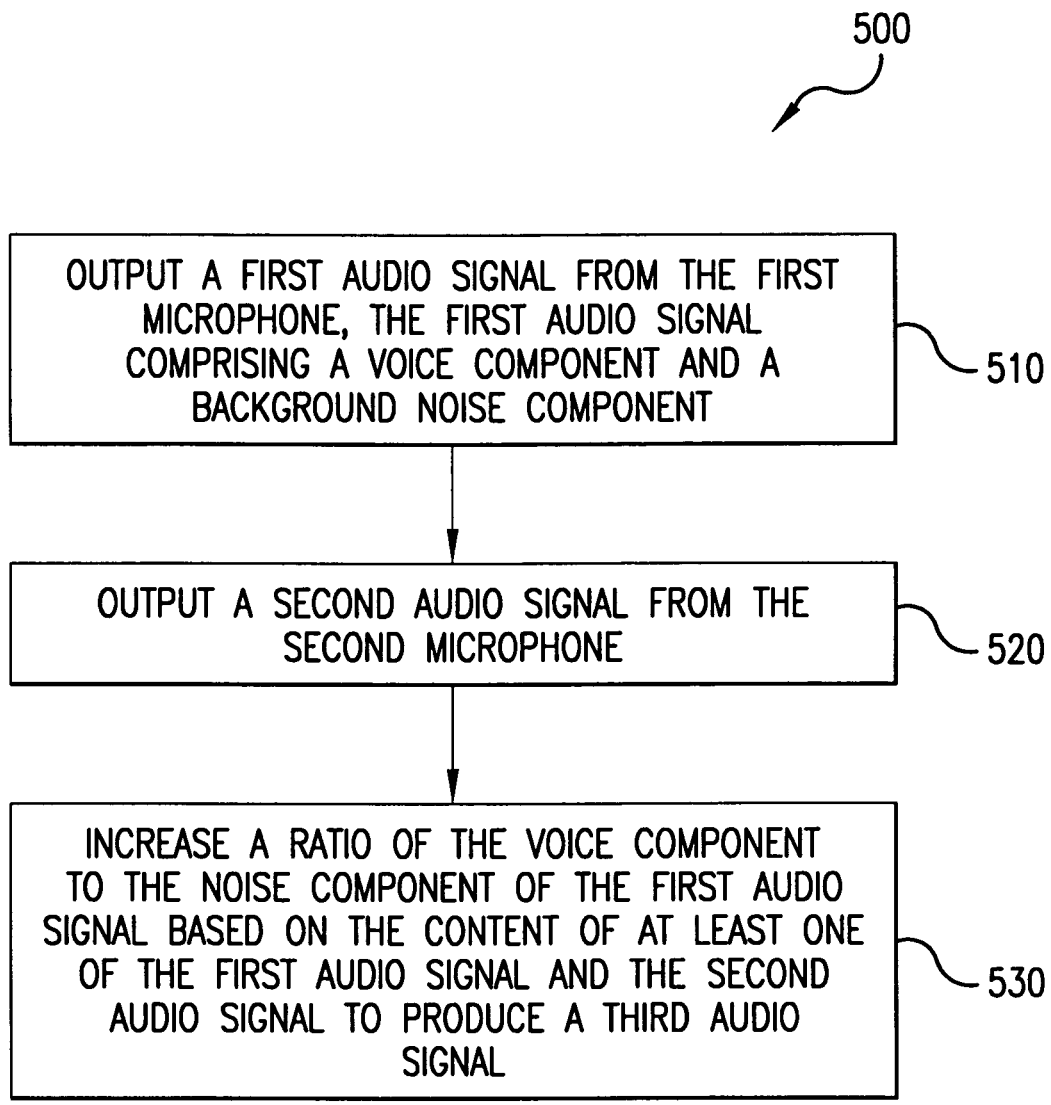
FIG. 5 illustrates a flowchart of a method for processing audio signals in a wireless telephone having a first microphone and a second microphone in accordance with an embodiment of the present invention.

The method by which audio signals are processed along transmit path 400 of the wireless telephone depicted in FIG. 4 will now be described with reference to the flowchart 500 of FIG. 5. The present invention, however, is not limited to the description provided by the flowchart 500. Rather, it will be apparent to persons skilled in the relevant art(s) from the teachings provided herein that other functional flows are within the scope and spirit of the present invention.

The method of flowchart 500 begins at step 510, in which first microphone 201 outputs a first audio signal, which includes a voice component and a background noise component. A/D converter 410 receives the first audio signal and converts it from an analog to digital format before providing it to signal processor 420.

At step 520, second microphone 202 outputs a second audio signal, which also includes a voice component and a background noise component. A/D converter 412 receives the second audio signal and converts it from an analog to digital format before providing it to signal processor 420.

At step 530, signal processor 420 receives and processes the first and second audio signals, thereby generating a third audio signal. In particular, signal processor 420 increases a ratio of the voice component to the noise component of the first audio signal based on the content of the second audio signal to produce a third audio signal.

The third audio signal is then provided directly to speech encoder 404. Speech encoder 404 and channel encoder 405 operate to encode the third audio signal using any of a variety of well known speech and channel encoding techniques. Modulator 406, RF module and antenna 408 then operate in a well-known manner to transmit the encoded audio signal to another telephone.

As will be discussed in more detail herein, signal processor 420 may comprise a background noise cancellation module and/or a noise suppressor. The manner in which the background noise cancellation module and the noise suppressor operate are described in more detail in subsections III and IV, respectively.

Figure 6:
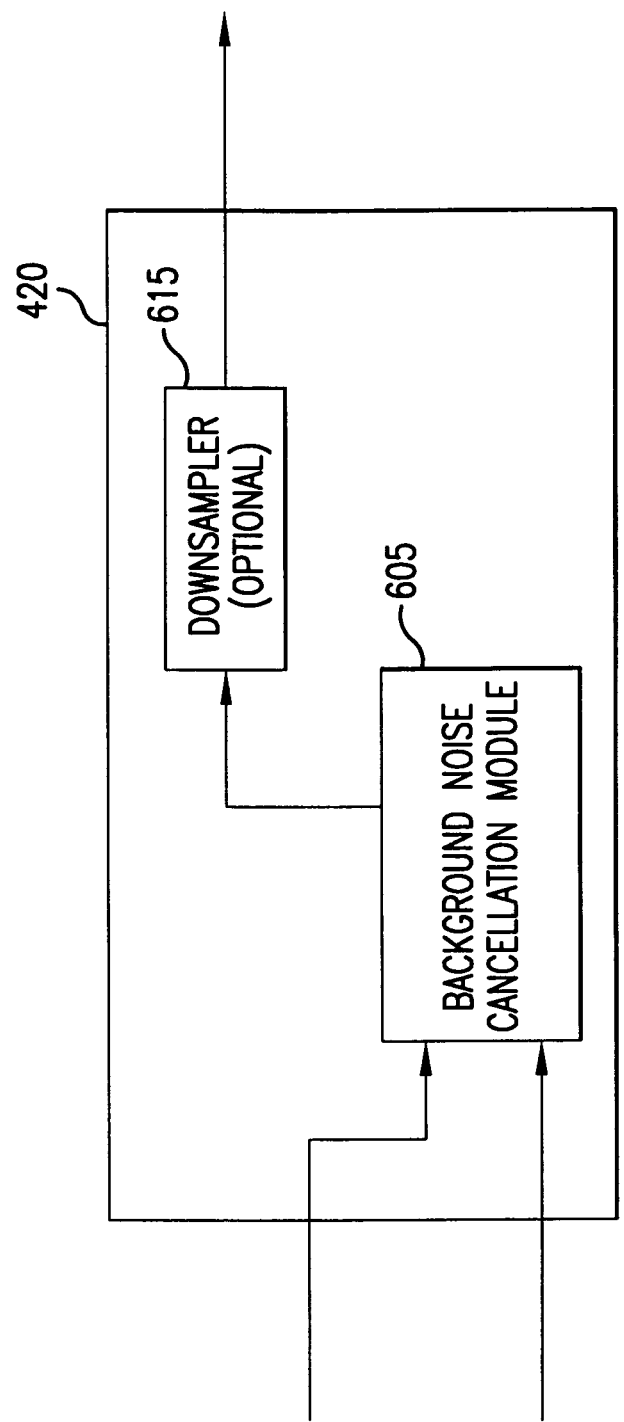
FIG. 6 is a functional block diagram of a signal processor in accordance with an embodiment of the present invention.

III. Use of Two Microphones to Perform Background Noise Cancellation in Accordance with an Embodiment of the Present Invention FIG. 6 depicts an embodiment in which signal processor 420 includes a background noise cancellation module 605 and a downsampler 615 (optional). Background noise cancellation module 605 receives the first and second audio signals output by the first and second microphones 201 and 202, respectively. Background noise cancellation module 605 uses the content of the second audio signal to cancel a background noise component present in the first audio signal to produce a third audio signal. The details of the cancellation are described below with reference to FIGS. 7 and 8. The third audio signal is sent to the rest of transmit path 400 before being transmitted to the telephone of a far-end user.

Figure 7:
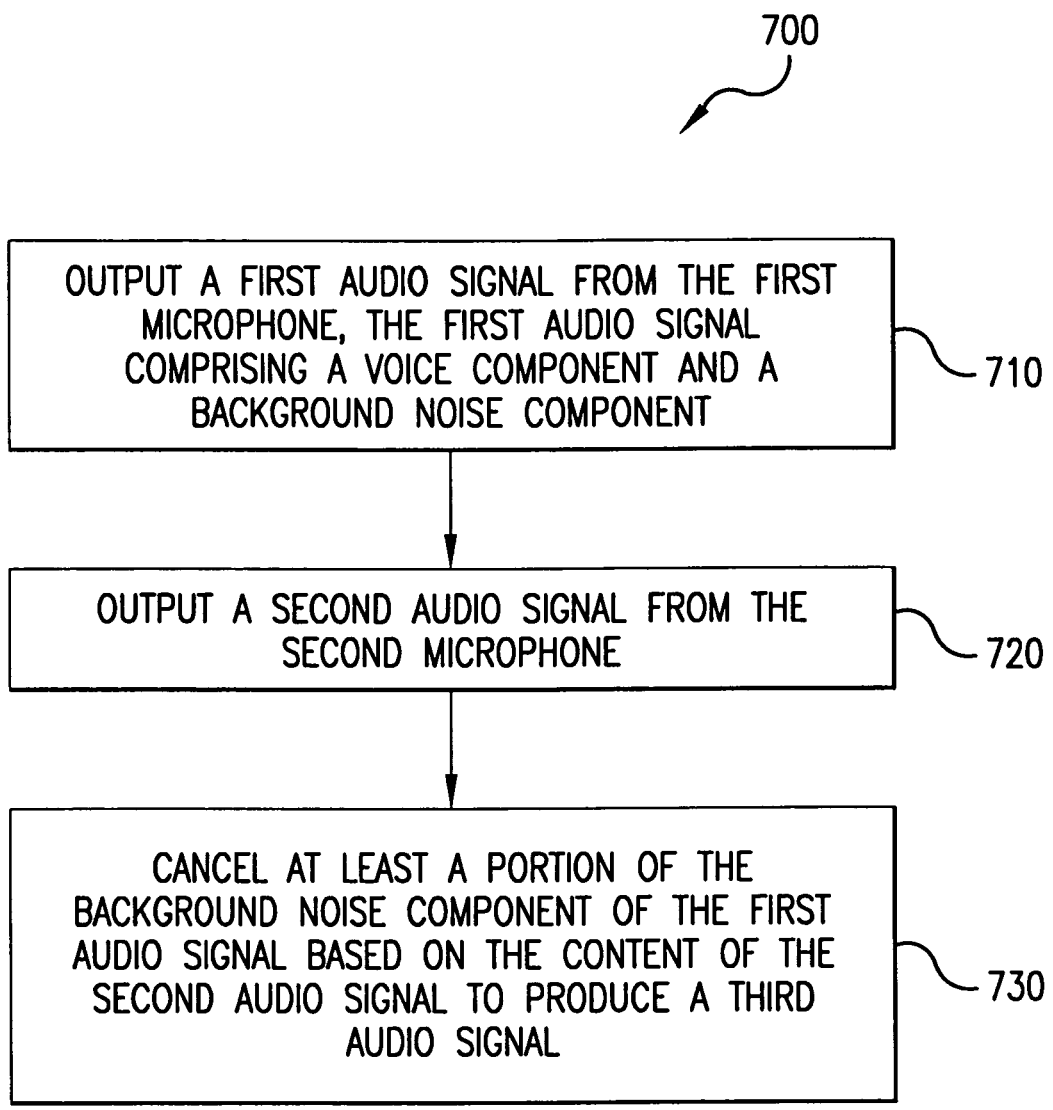
FIG. 7 illustrates a flowchart of a method for processing audio signals in a wireless telephone having a first microphone and a second microphone in accordance with an embodiment of the present invention.

FIG. 7 illustrates a flowchart 700 of a method for processing audio signals using a wireless telephone having two microphones in accordance with an embodiment of the present invention. Flowchart 700 is used to facilitate the description of how background noise cancellation module 605 cancels at least a portion of a background noise component included in the first audio signal output by first microphone 201.

The method of flowchart 700 starts at step 710, in which first microphone 201 outputs a first audio signal. The first audio signal includes a voice component and a background noise component. In step 720, second microphone 202 outputs a second audio signal. Similar to the first audio signal, the second audio signal includes a voice component and a background noise component.

Figure 8:
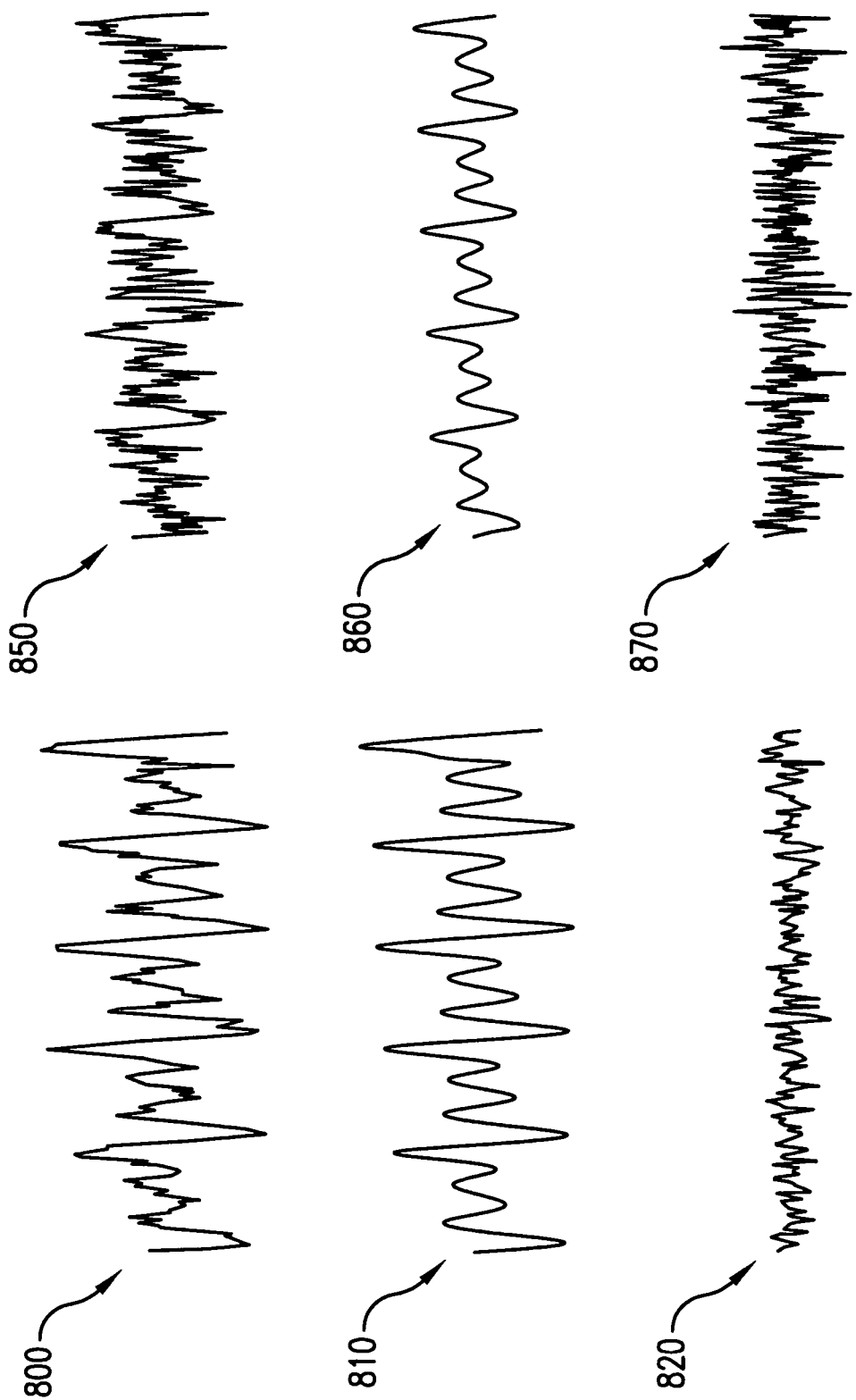
FIG. 8 illustrates voice and noise components output from first and second microphones, in an embodiment of the present invention.

FIG. 8 shows exemplary outputs from first and second microphones 201 and 202, respectively, upon which background noise cancellation module 605 may operate. FIG. 8 shows an exemplary first audio signal 800 output by first microphone 201. First audio signal 800 consists of a voice component 810 and a background noise component 820, which are also separately depicted in FIG. 8 for illustrative purposes. FIG. 8 further shows an exemplary second audio signal 850 output by second microphone 202. Second audio signal 850 consists of a voice component 860 and a background noise component 870, which are also separately depicted in FIG. 8. As can be seen from FIG. 8, the amplitude of the voice component picked up by first microphone 201 (i.e., voice component 810) is advantageously greater than the amplitude of the voice component picked up by second microphone 202 (i.e., voice component 860), and vice versa for the background noise components. As was discussed earlier, the relative amplitude of the voice component (background noise component) picked up by first microphone 201 and second microphone 202 is a function of their respective locations on wireless telephone 200.

At step 730 (FIG. 7), background noise cancellation module 605 uses the second audio signal to cancel at least a portion of the background noise component included in the first audio signal output by first microphone 201. Finally, the third audio signal produced by background noise cancellation module 605 is transmitted to another telephone. That is, after background noise cancellation module 605 cancels out at least a portion of the background noise component of the first audio signal output by first microphone 201 to produce a third audio signal, the third audio signal is then processed through the standard components or processing steps used in conventional encoder/decoder technology, which were described above with reference to FIG. 1A. The details of these additional signal processing steps are not described further for brevity.

Figure 9:
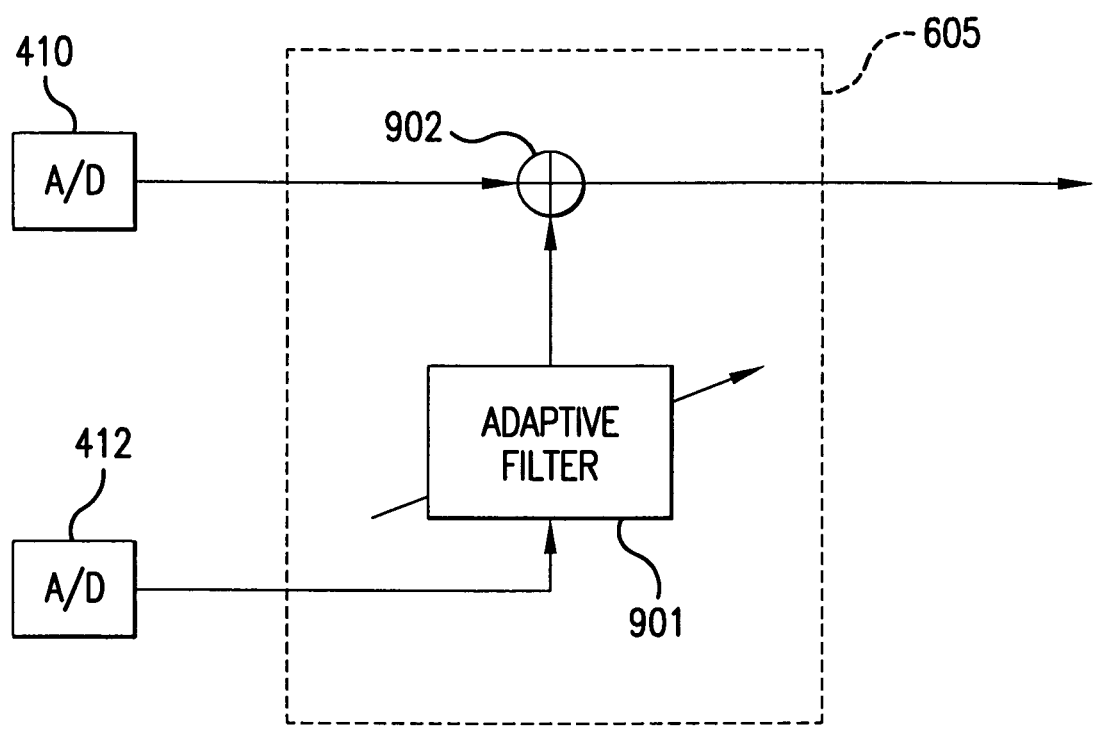
FIG. 9 is a functional block diagram of a background noise cancellation module in accordance with an embodiment of the present invention.

In one embodiment, background noise cancellation module 605 includes an adaptive filter and an adder. FIG. 9 depicts a background noise cancellation module 605 including an adaptive filter 901 and an adder 902. Adaptive filter 901 receives the second audio signal from second microphone 202 and outputs an audio signal. Adder 902 adds the first audio signal, received from first microphone 201, to the audio signal output by adaptive filter 901 to produce a third audio signal. By adding the first audio signal to the audio signal output by adaptive filter 901, the third audio signal produced by adder 902 has at least a portion of the background noise component that was present in the first audio signal cancelled out.

In another embodiment of the present invention, signal processor 420 includes a background noise cancellation module 605 and a downsampler 615. In accordance with this embodiment, A/D converter 410 and A/D converter 412 sample the first and second audio signals output by first and second microphones 201 and 202, respectively, at a higher sampling rate than is typically used within wireless telephones. For example, the first audio signal output by first microphone 201 and the second audio signal output by second microphones 202 can be sampled at 16 kHz by A/D converters 410 and 412, respectively; in comparison, the typical signal sampling rate used in a transmit path of most conventional wireless telephones is 8 kHz. After the first and second audio signals are processed through background noise cancellation module 605 to cancel out the background noise component from the first audio signal, downsampler 615 downsamples the third audio signal produced by background cancellation module 605 back to the proper sampling rate (e.g. 8 kHz). The higher sampling rate of this embodiment offers more precise time slicing and more accurate time matching, if added precision and accuracy are required in the background noise cancellation module 605.

As mentioned above and as is described in more detail in the next subsection, additionally or alternatively, the audio signal output by the second microphone is used to improve noise suppression of the audio signal output by the first microphone.

Figure 10:
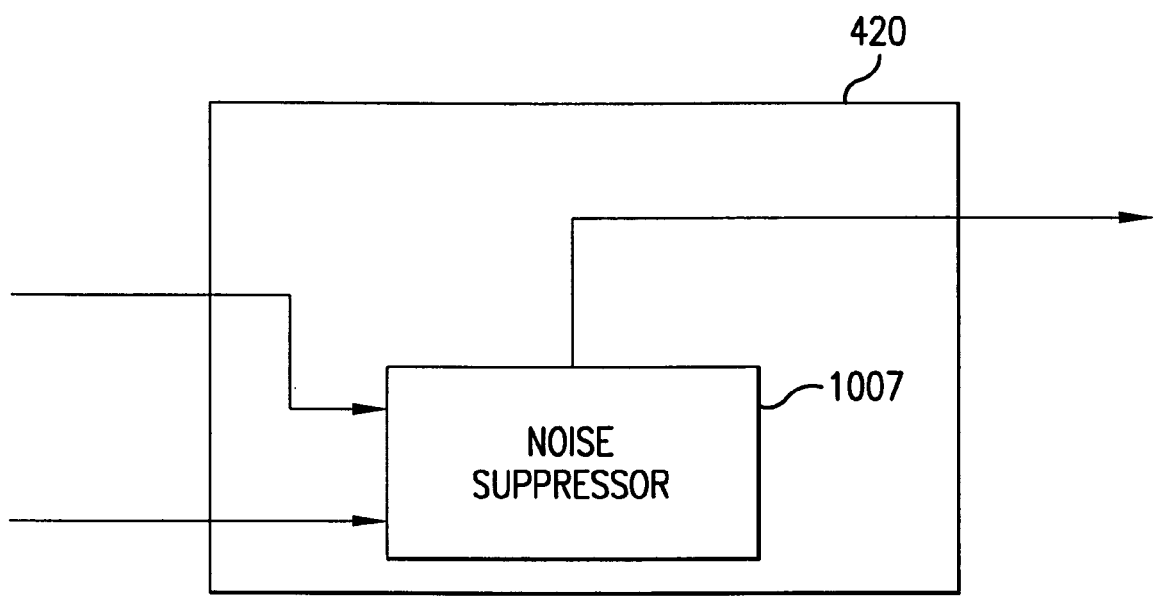
FIG. 10 is a functional block diagram of a signal processor in accordance with an embodiment of the present invention.

IV. Use of Two Microphones to Perform Improved Noise Suppression in Accordance with an Embodiment of the Present Invention As noted above, signal processor 420 may include a noise suppressor. FIG. 10 shows an embodiment in which signal processor 420 includes a noise suppressor 1007. In accordance with this embodiment, noise suppressor 1007 receives the first audio signal and the second audio signal output by first and second microphones 201 and 202, respectively. Noise suppressor 1007 suppresses at least a portion of the background noise component included in the first audio signal based on the content of the first audio signal and the second audio signal. The details of this background noise suppression are described in more detail with reference to FIG. 11.

Figure 11:
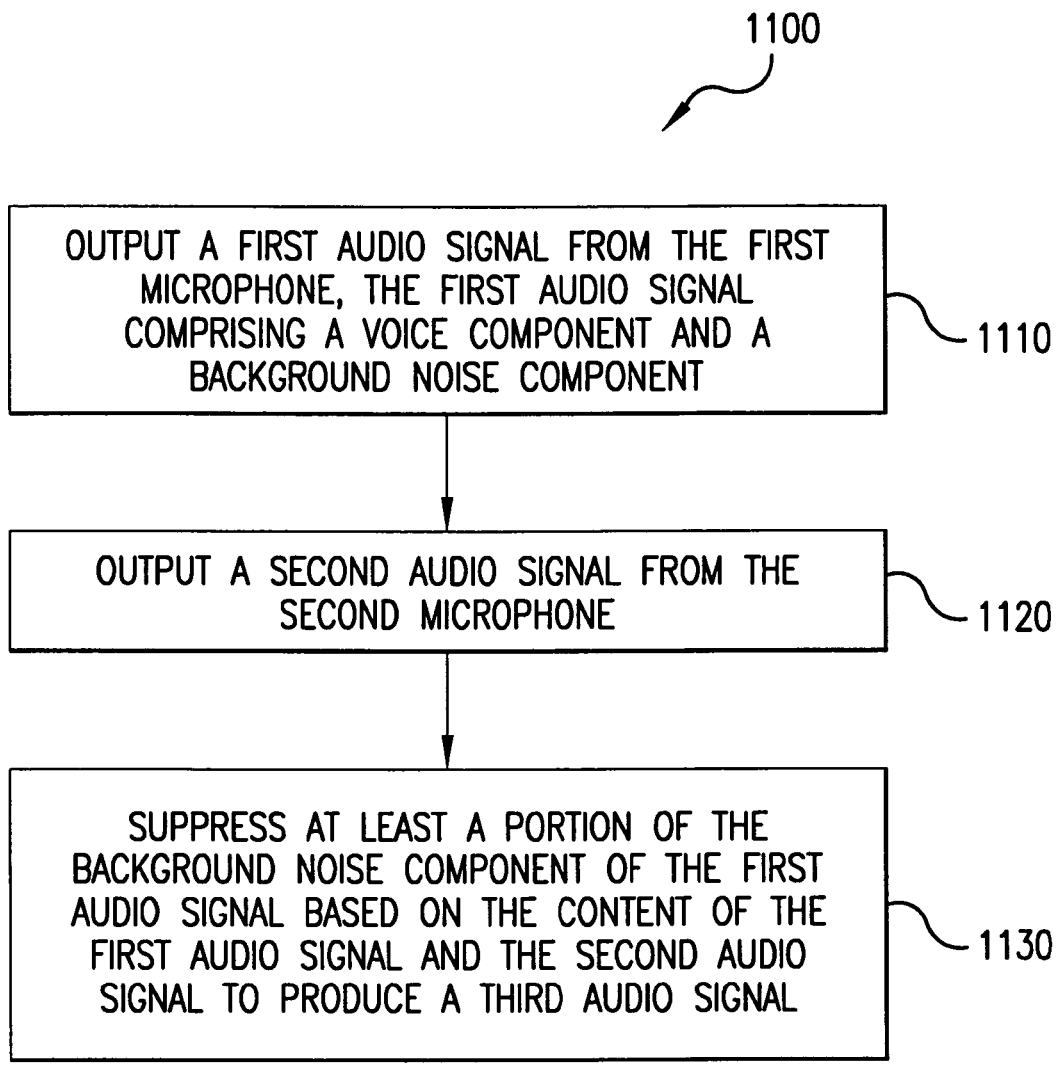
FIG. 11 illustrates a flowchart of a method for processing audio signals in a wireless telephone having a first microphone and a second microphone in accordance with an embodiment of the present invention.

FIG. 11 illustrates a flowchart 1100 of a method for processing audio signals using a wireless telephone having a first and a second microphone in accordance with an embodiment of the present invention. This method is used to suppress at least a portion of the background noise component included in the output of the first microphone.

The method of flowchart 1100 begins at step 1110, in which first microphone 201 outputs a first audio signal that includes a voice component and a background noise component. In step 1120, second microphone 202 outputs a second audio signal that includes a voice component and a background noise component.

At step 1130, noise suppressor 1007 receives the first and second audio signals and suppresses at least a portion of the background noise component of the first audio signal based on the content of the first and second audio signals to produce a third audio signal. The details of this step will now be described in more detail.

Figure 12A:
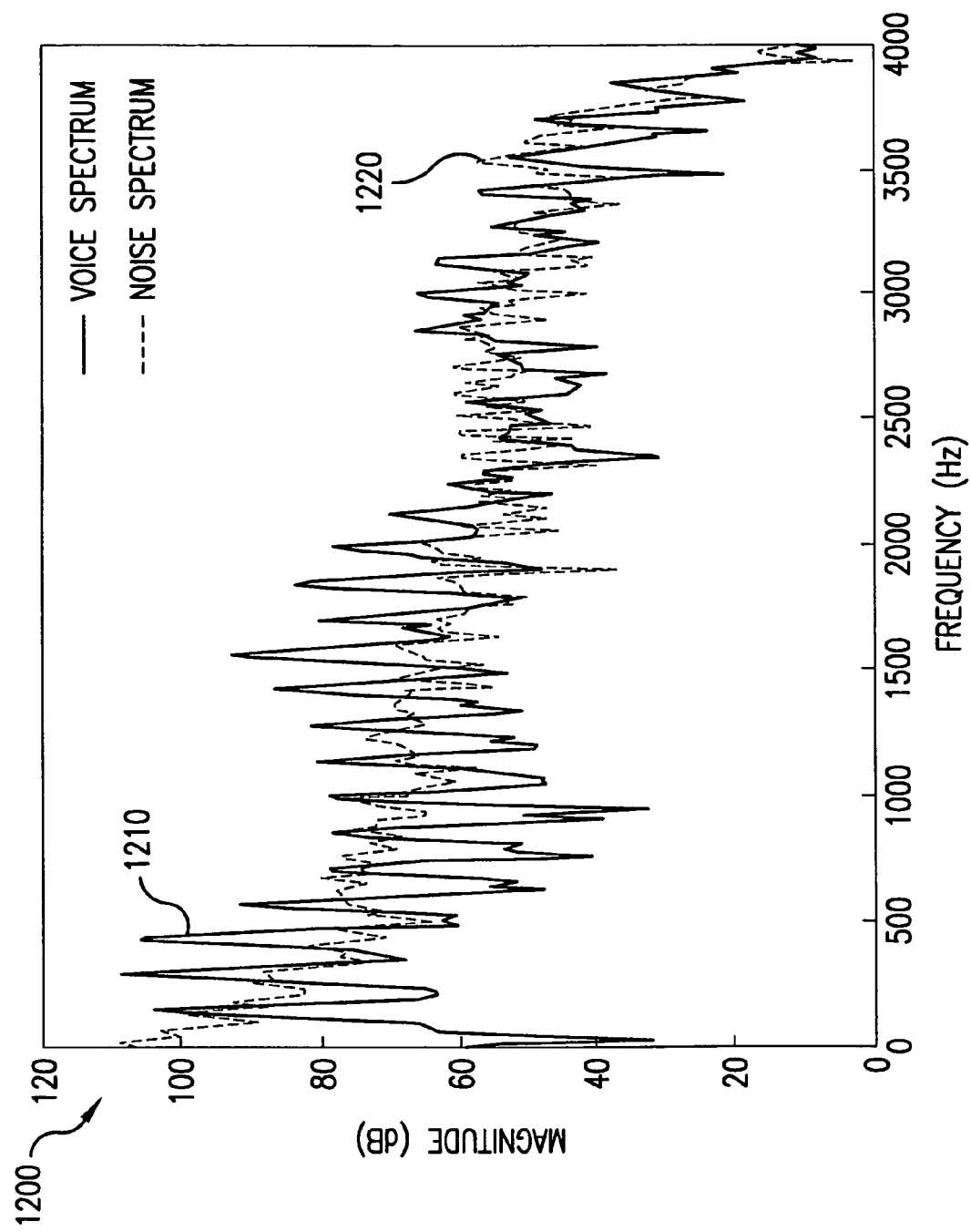
FIG. 12A illustrates an exemplary frequency spectrum of a voice component and a background noise component of a first audio signal output by a first microphone, in an embodiment of the present invention.
Figure 12B:
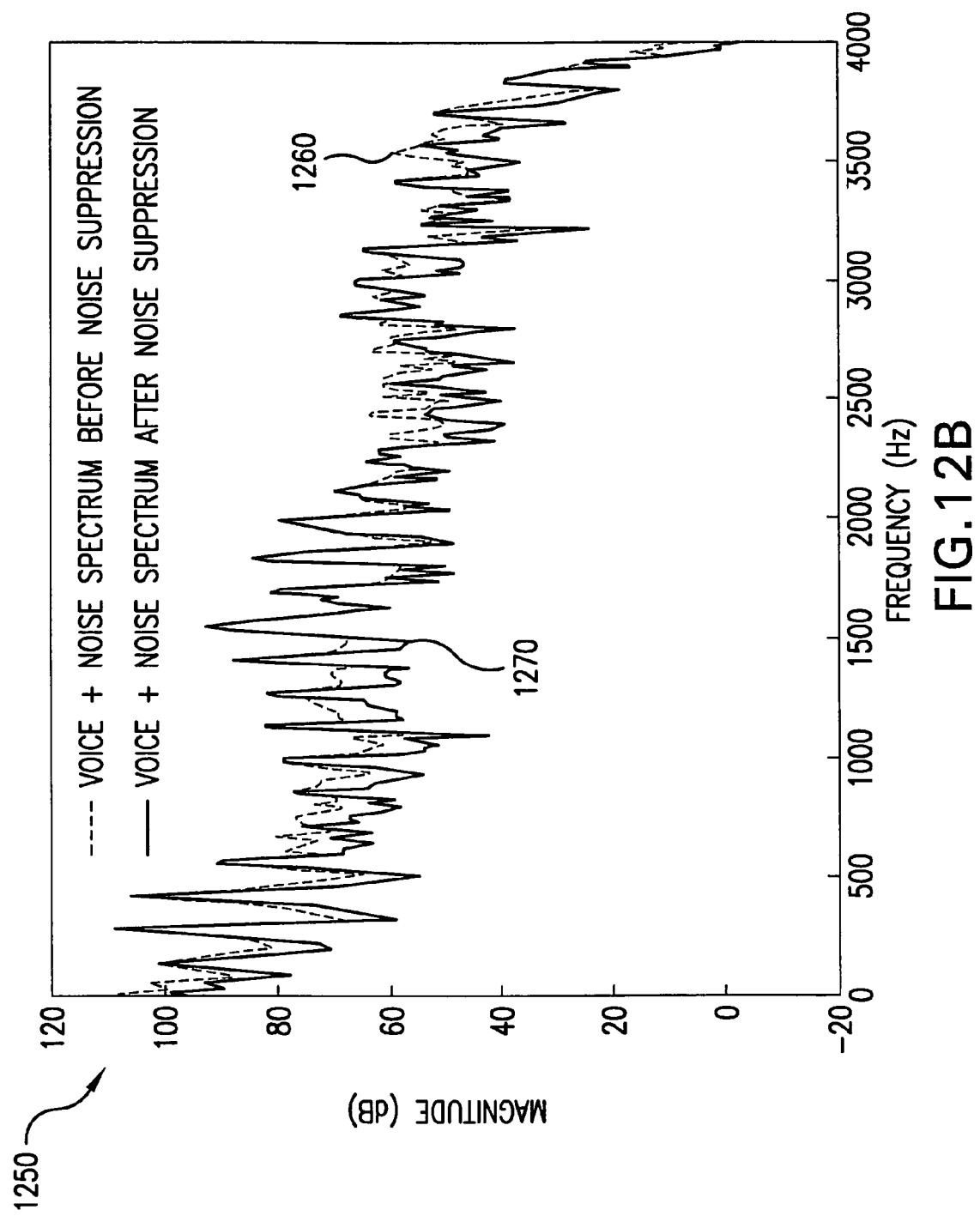
FIG. 12B illustrates an exemplary frequency spectrum of an audio signal upon which noise suppression has been performed, in accordance with an embodiment of the present invention.

In one embodiment, noise suppressor 1007 converts the first and second audio signals into the frequency domain before suppressing the background noise component in the first audio signal. FIGS. 12A and 12B show exemplary frequency spectra that are used to illustrate the function of noise suppressor 1007.

FIG. 12A shows two components: a voice spectrum component 1210 and a noise spectrum component 1220. Voice spectrum 1210 includes pitch harmonic peaks (the equally spaced peaks) and the three formants in the spectral envelope.

FIG. 12A is an exemplary plot used for conceptual illustration purposes only. It is to be appreciated that voice component 1210 and noise component 1220 are mixed and inseparable in audio signals picked up by actual microphones. In reality, a microphone picks up a single mixed voice and noise signal and its spectrum.

FIG. 12B shows an exemplary single mixed voice and noise spectrum before noise suppression (i.e., spectrum 1260) and after noise suppression (i.e., spectrum 1270). For example, spectrum 1260 is the magnitude of a Fast Fourier Transform (FFT) of the first audio signal output by first microphone 201.

A typical noise suppressor keeps an estimate of the background noise spectrum (e.g., spectrum 1220 in FIG. 12A), and then compares the observed single voice and noise spectrum (e.g., spectrum 1260 in FIG. 12B) with this estimated background noise spectrum to determine whether each frequency component is predominately voice or predominantly noise. If it is considered predominantly noise, the magnitude of the FFT coefficient at that frequency is attenuated. If it is considered predominantly voice, then the FFT coefficient is kept as is. This can be seen in FIG. 12B.

There are many frequency regions where spectrum 1270 is on top of spectrum 1260. These frequency regions are considered to contain predominantly voice. On the other hand, regions where spectrum 1260 and spectrum 1270 are at different places are the frequency regions that are considered predominantly noise. By attenuating the frequency regions that are predominantly noise, noise suppressor 1007 produces a third audio signal (e.g., an audio signal corresponding to frequency spectrum 1270) with an increased ratio of the voice component to background noise component compared to the first audio signal.

The operations described in the last two paragraphs above correspond to a conventional single-microphone noise suppression scheme. According to an embodiment of the present invention, noise suppressor 1007 additionally uses the spectrum of the second audio signal picked up by the second microphone to estimate the background noise spectrum 1220 more accurately than in a single-microphone noise suppression scheme.

In a conventional single-microphone noise suppressor, background noise spectrum 1220 is estimated between "talk spurts", i.e., during the gaps between active speech segments corresponding to uttered syllables. Such a scheme works well only if the background noise is relatively stationary, i.e., when the general shape of noise spectrum 1220 does not change much during each talk spurt. If noise spectrum 1220 changes significantly through the duration of the talk spurt, then the single-microphone noise suppressor will not work well because the noise spectrum estimated during the last "gap" is not reliable. Therefore, in general, and especially for non-stationary background noise, the availability of the spectrum of the second audio signal picked up by the second microphone allows noise suppressor 1007 to get a more accurate, up-to-date estimate of noise spectrum 1220, and thus achieve better noise suppression performance.

Note that the spectrum of the second audio signal should not be used directly as the estimate of the noise spectrum 1220. There are at least two problems with using the spectrum of the second audio signal directly: first, the second audio signal may still have some voice component in it; and second, the noise component in the second audio signal is generally different from the noise component in the first audio signal.

To circumvent the first problem, the voice component can be cancelled out of the second audio signal. For example, in conjunction with a noise cancellation scheme, the noise-cancelled version of the first audio signal, which is a cleaner version of the main voice signal, can pass through an adaptive filter. The signal resulting from the adaptive filter can be added to the second audio signal to cancel out a large portion of the voice component in the second audio signal.

To circumvent the second problem, an approximation of the noise component in the first audio signal can be determined, for example, by filtering the voice-cancelled version of the second audio signal with adaptive filter 901.

The example method outlined above, which includes the use of a first and second audio signal, allows noise suppressor 1007 to obtain a more accurate and up-to-date estimate of noise spectrum 1220 during a talk spurt than a conventional noise suppression scheme that only uses one audio signal. An alternative embodiment of the present invention can use the second audio signal picked up by the second microphone to help obtain a more accurate determination of talk spurts versus inter-syllable gaps; and this will, in turn, produce a more reliable estimate of noise spectrum 1220, and thus improve the noise suppression performance.

For the particular example of FIG. 12B, spectrum 1260 in the noise regions is attenuated by 10 dB resulting in spectrum 1270. It should be appreciated that an attenuation of 10 dB is shown for illustrative purposes, and not limitation. It will be apparent to persons having ordinary skill in the art that spectrum 1260 could be attenuated by more or less than 10 dB.

Lastly, the third audio signal is transmitted to another telephone. The processing and transmission of the third audio signal is achieved in like manner to that which was described above in reference to conventional transmit path 100 (FIG. 1A).

As mentioned above and as is described in more detail in the next subsection, additionally or alternatively, the audio signal output by the second microphone is used to improve VAD technology incorporated within the wireless telephone.

Figure 13:
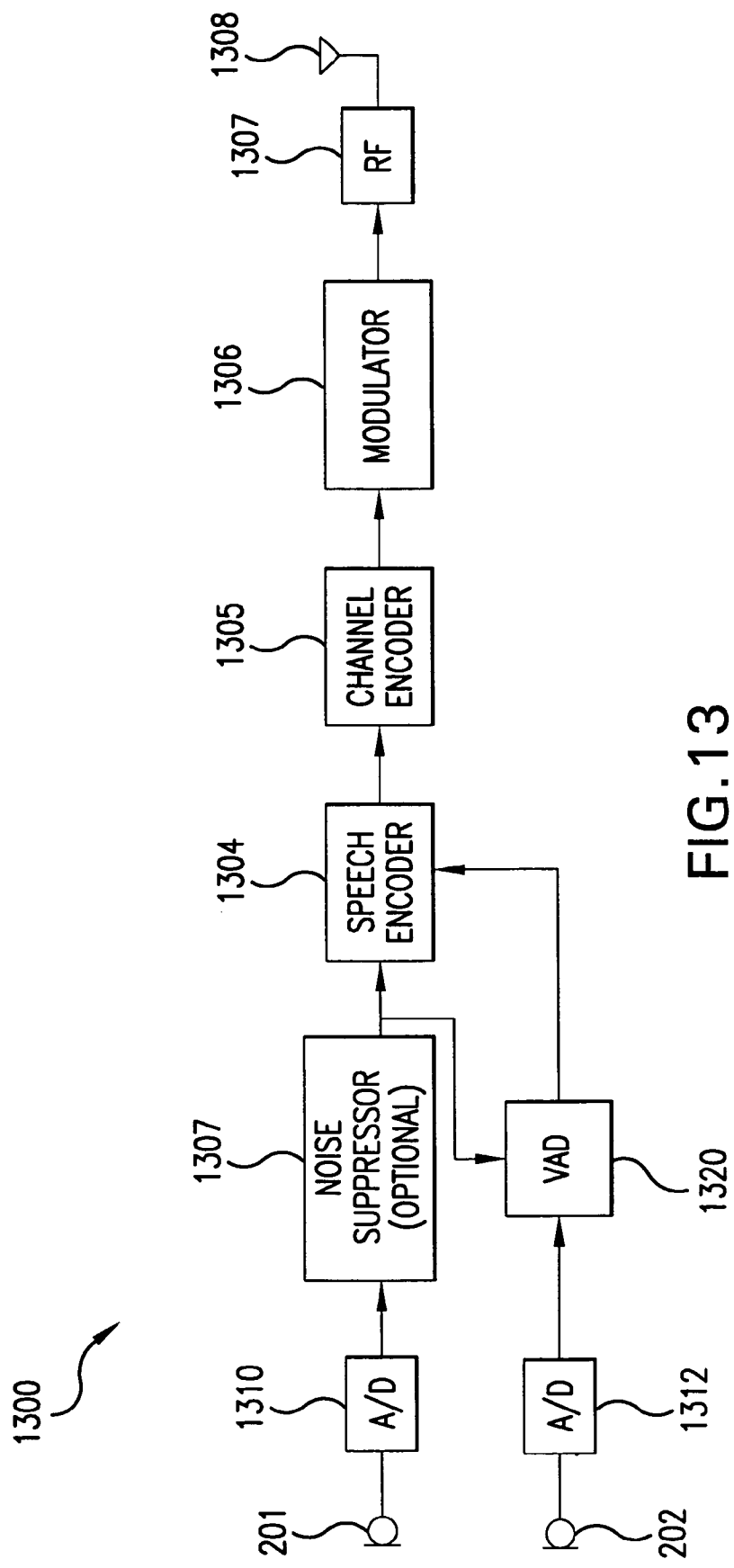
FIG. 13 is a functional block diagram of a transmit path of a wireless telephone in accordance with an embodiment of the present invention.

V. Use of Two Microphones to Perform Improved VAD in Accordance with an Embodiment of the Present Invention FIG. 13 is a functional block diagram of a transmit path 1300 of a wireless telephone that is implemented with a first microphone and a second microphone in accordance with an embodiment of the present invention. Transmit path 1300 includes a first microphone 201 and a second microphone 202. In addition, transmit path 1300 includes an A/D converter 1310, an A/D converter 1312, a noise suppressor 1307 (optional), a VAD 1320, a speech encoder 1304, a channel encoder 1305, a modulator 1306, an RF module 1307, and an antenna 1308. Speech encoder 1304, channel encoder 1305, modulator 1306, RF module 1307, and antenna 1308 are respectively analogous to speech encoder 104, channel encoder 105, modulator 106, RF module 107, and antenna 108 discussed with reference to transmit path 100 of FIG. 1A and thus their operation will not be discussed in detail below.

For illustrative purposes and not limitation, transmit path 1300 is described in an embodiment in which noise suppressor 1307 is not present. In this example embodiment, VAD 1320 receives the first audio signal and second audio signal output by first microphone 201 and the second microphone 202, respectively. VAD 1320 uses both the first audio signal output by the first microphone 201 and the second audio signal output by second microphone 202 to provide detection of voice activity in the first audio signal. VAD 1320 sends an indication signal to speech encoder 1304 indicating which time intervals of the first audio signal include a voice component. The details of the function of VAD 1320 are described with reference to FIG. 14.

Figure 14:
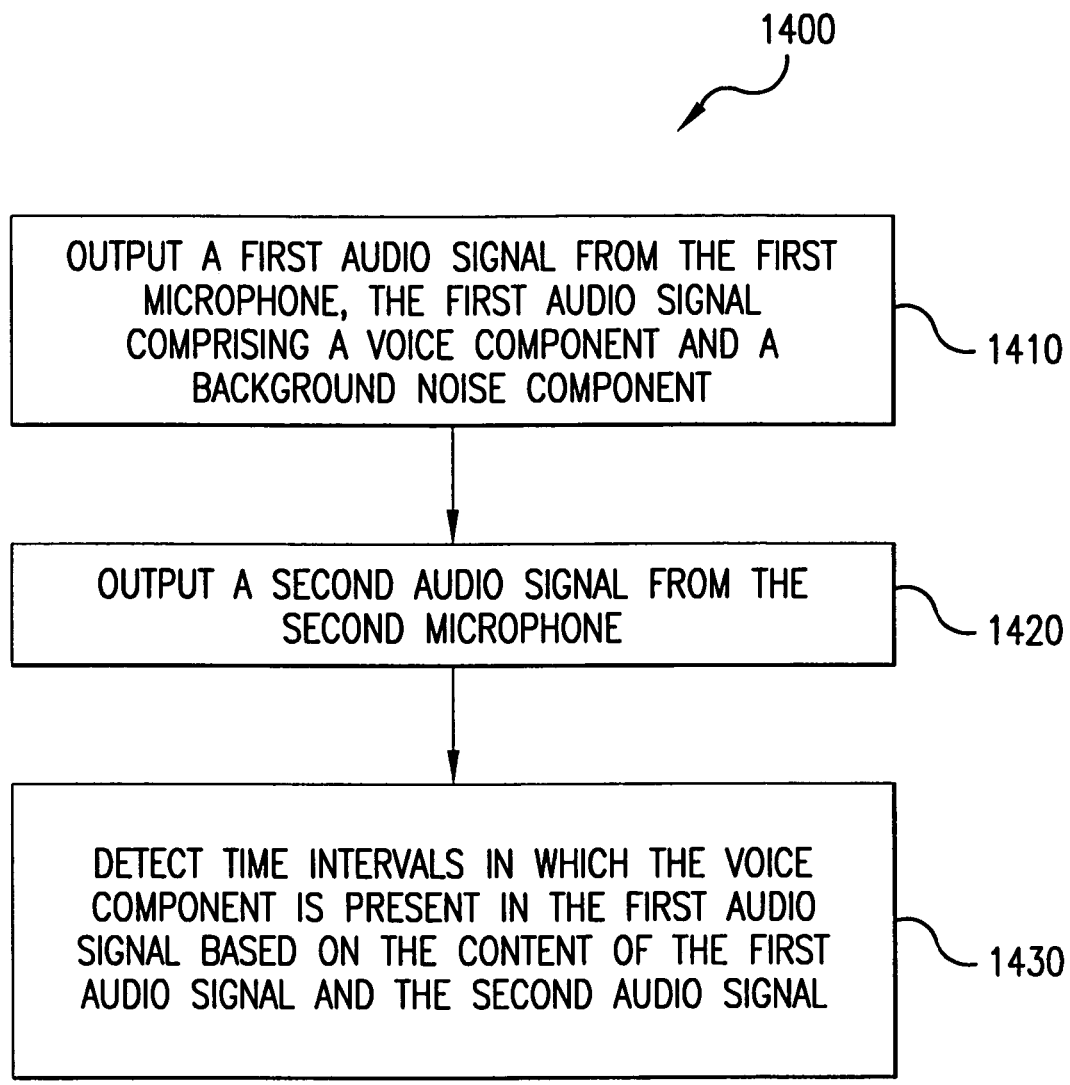
FIG. 14 is a flowchart depicting a method for processing audio signals in a wireless telephone having a first microphone and a second microphone in accordance with an embodiment of the present invention.

FIG. 14 illustrates a flowchart 1400 of a method for processing audio signals in a wireless telephone having a first and a second microphone, in accordance with an embodiment of the present invention. This method is used to detect time intervals in which an audio signal output by the first microphone includes a voice component.

The method of flowchart 1400 begins at step 1410, in which first microphone 201 outputs a first audio signal the includes a voice component and a background noise component. In step 1420, second microphone 202 outputs a second audio signal that includes a voice component and a background noise component.

FIG. 15 shows exemplary plots of the first and second audio signals output by first and second microphones 201 and 202, respectively. Plot 1500 is a representation of the first audio signal output by first microphone 201. The audio signal shown in plot 1500 includes a voice component 1510 and a background noise component 1520. The audio signal shown in plot 1550 is a representation of the second audio signal output by second microphone 202. Plot 1550 also includes a voice component 1560 and a background noise component 1570. As discussed above, since first microphone 201 is preferably closer to a user's mouth during regular use than second microphone 202, the amplitude of voice component 1510 is greater than the amplitude of voice component 1560. Conversely, the amplitude of background noise component 1570 is greater than the amplitude of background noise component 1520.

As shown in step 1430 of flowchart. 1400, VAD 1320, based on the content of the first audio signal (plot 1500) and the second audio signal (plot 1550), detects time intervals in which voice component 1510 is present in the first audio signal. By using the second audio signal in addition to the first audio signal to detect voice activity in the first audio signal, VAD 1320 achieves improved voice activity detection as compared to VAD technology that only monitors one audio signal. That is, the additional information coming from the second audio signal, which includes mostly background noise component 1570, helps VAD 1320 better differentiate what in the first audio signal constitutes the voice component, thereby helping VAD 1320 achieve improved performance.

As an example, according to an embodiment of the present invention, in addition to all the other signal features that a conventional single-microphone VAD normally monitors, VAD 1320 can also monitor the energy ratio or average magnitude ratio between the first audio signal and the second audio signal to help it better detect voice activity in the first audio signal. This possibility is readily evident by comparing first audio signal 1500 and second audio signal 1550 in FIG. 15. For audio signals 1500 and 1550 shown in FIG. 15, the energy of first audio signal 1500 is greater than the energy of second audio signal 1550 during talk spurt (active speech). On the other hand, during the gaps between talk spurts (i.e. background noise only regions), the opposite is true. Thus, the energy ratio of the first audio signal over the second audio signal goes from a high value during talk spurts to a low value during the gaps between talk spurts. This change of energy ratio provides a valuable clue about voice activity in the first audio signal. This valuable clue is not available if only a single microphone is used to obtain the first audio signal. It is only available through the use of two microphones, and VAD 1320 can use this energy ratio to improve its accuracy of voice activity detection.

VI. Alternative Embodiments of the Present Invention

In an example alternative embodiment (not shown), signal processor 420 includes both a background noise cancellation module and a noise suppressor. In this embodiment, the background noise cancellation module cancels at least a portion of a background noise component included in the first audio signal based on the content of the second audio signal to produce a third audio signal. Then the noise suppressor receives the second and third audio signals and suppresses at least a portion of a residual background noise component present in the third audio signal based on the content of the second audio signal and the third audio signal, in like manner to that described above. The noise suppressor then provides a fourth audio signal to the remaining components and/or processing steps, as described above.

In another alternative example embodiment, a transmit path having a first and second microphone can include a signal processor (similar to signal processor 420) and a VAD (similar to VAD 1320). A person having ordinary skill in the art will appreciate that a signal processor can precede a VAD in a transmit path, or vice versa. In addition, a signal processor and a VAD can process the outputs of the two microphones contemporaneously. For illustrative purposes, and not limitation, an embodiment in which a signal processor precedes a VAD in a transmit path having two microphones is described in more detail below.

In this illustrative embodiment, a signal processor increases a ratio of a voice component to a background noise component of a first audio signal based on the content of at least one of the first audio signal and a second audio signal to produce a third audio signal (similar to the function of signal processor 420 described in detail above). The third audio signal is then received by a VAD. The VAD also receives a second audio signal output by a second microphone (e.g., second microphone 202). In a similar manner to that described in detail above, the VAD detects time intervals in which a voice component is present in the third signal based on the content of the second audio signal and the third audio signal.

In a still further embodiment, a VAD can precede a noise suppressor, in a transmit path having two microphones. In this embodiment, the VAD receives a first audio signal and a second audio signal output by a first microphone and a second microphone, respectively, to detect time intervals in which a voice component is present in the first audio signal based on the content of the first and second audio signals, in like manner to that described above. The noise suppressor receives the first and second audio signals and suppresses a background noise component in the first audio signal based on the content of the first audio signal and the second audio signal, in like manner to that described above.

VII. Embodiments Implementing Uni-Directional Microphones

At least one of the microphones used in exemplary wireless telephone 200 can be a uni-directional microphone in accordance with an embodiment of the present invention. As will be described in more detail below, a uni-directional microphone is a microphone that is most sensitive to sound waves originating from a particular direction (e.g., sound waves coming from directly in front of the microphone). Some of the information provided below concerning uni-directional and omni-directional microphones was found on the following website: <http://www.audio-technica.com/using/mphones/guide/pattern.html>.

Figure 16:
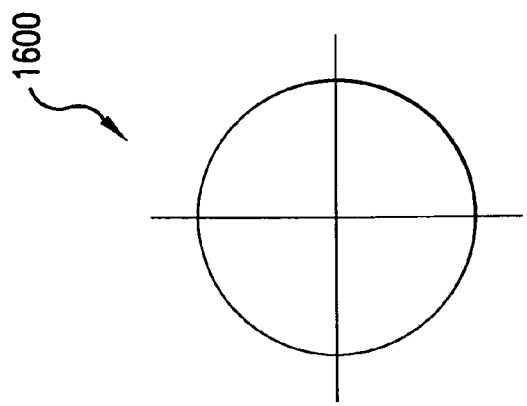
FIG. 16 shows an exemplary polar pattern of an omnidirectional microphone.

Persons skilled in the relevant art(s) will appreciate that microphones are often identified by their directional properties—that is, how well the microphones pick up sound from various directions. Omni-directional microphones pick up sound from just about every direction equally. Thus, omni-directional microphones work substantially the same pointed away from a subject as pointed toward it, if the distances are equal. FIG. 16 illustrates a polar pattern 1600 of an omni-directional microphone. A polar pattern is a round plot that illustrates the sensitivity of a microphone in decibels (dB) as it rotates in front of a fixed sound source. Polar patterns, which are also referred to in the art as "pickup patterns" or "directional patterns," are well-known graphical aids for illustrating the directional properties of a microphone. As shown by polar pattern 1600 of FIG. 16, an omni-directional microphone picks up sounds equally in all directions.

In contrast to omni-directional microphones, uni-directional microphones are specially designed to respond best to sound originating from a particular direction while tending to reject sound that arrives from other directions. This directional ability is typically implemented through the use of external openings and internal passages in the microphone that allow sound to reach both sides of the diaphragm in a carefully controlled way. Thus, in an example uni-directional microphone, sound arriving from the front of the microphone will aid diaphragm motion, while sound arriving from the side or rear will cancel diaphragm motion.

Exemplary types of uni-directional microphones include but are not limited to subcardioid, cardioid, hypercardioid, and line microphones. Polar patterns for example microphones of each of these types are provided in FIG. 17 (subcardioid), FIG. 18 (cardioid), FIG. 19 (hypercardioid) and FIG. 20 (line). Each of these figures shows the acceptance angle and null(s) for each microphone. The acceptance angle is the maximum angle within which a microphone may be expected to offer uniform sensitivity. Acceptance angles may vary with frequency; however, high-quality microphones have polar patterns which change very little when plotted at different frequencies. A null defines the angle at which a microphone exhibits minimum sensitivity to incoming sounds.

Figure 17:
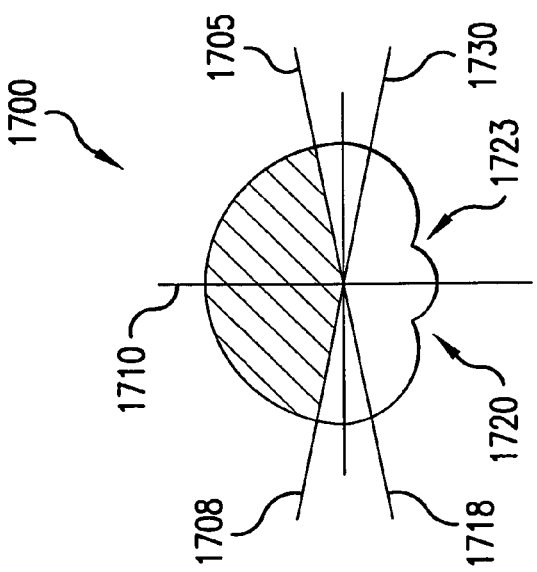
FIG. 17 shows an exemplary polar pattern of a subcardioid microphone.

FIG. 17 shows an exemplary polar pattern 1700 for a subcardioid microphone. The acceptance angle for polar pattern 1700 spans 170-degrees, measured in a counterclockwise fashion from line 1705 to line 1708. The null for polar pattern 1700 is not located at a particular point, but spans a range of angles—i.e., from line 1718 to line 1730. Lines 1718 and 1730 are at 100-degrees from upward-pointing vertical axis 1710, as measured in a counterclockwise and clockwise fashion, respectively. Hence, the null for polar pattern 1700 spans 160-degrees from line 1718 to line 1730, measured in a counterclockwise fashion.

Figure 18:
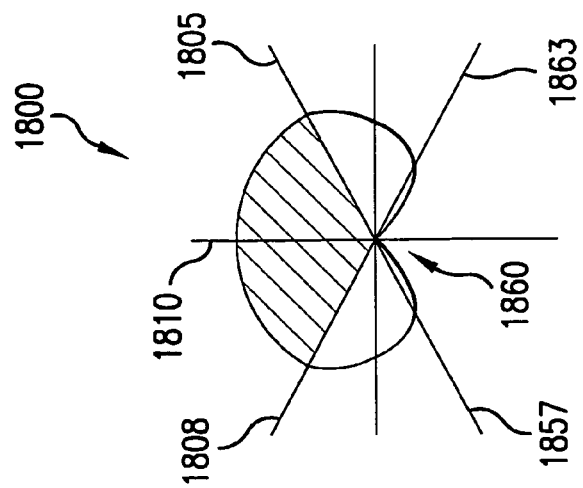
FIG. 18 shows an exemplary polar pattern of a cardioid microphone.

FIG. 18 shows an exemplary polar pattern 1800 for a cardioid microphone. The acceptance angle for polar pattern 1800 spans 120-degrees, measured in a counterclockwise fashion from line 1805 to line 1808. Polar pattern 1800 has a single null 1860 located 180-degrees from upward-pointing vertical axis 1810.

Figure 19:
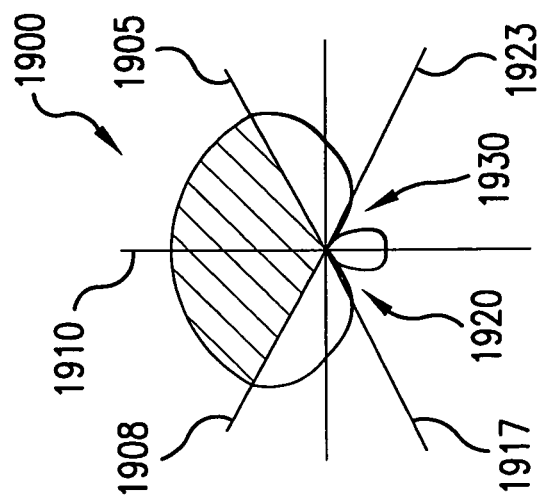
FIG. 19 shows an exemplary polar pattern of a hypercardioid microphone.

FIG. 19 shows an exemplary polar pattern 1900 for a hyper-cardioid microphone. The acceptance angle for polar pattern 1900 spans 100-degrees, measured in a counterclockwise fashion from line 1905 to line 1908. Polar pattern 1900 has a first null 1920 and a second null 1930. First null 1920 and second null 1930 are each 110-degrees from upward-pointing vertical axis 1910, as measured in a counterclockwise and clockwise fashion, respectively.

Figure 20:
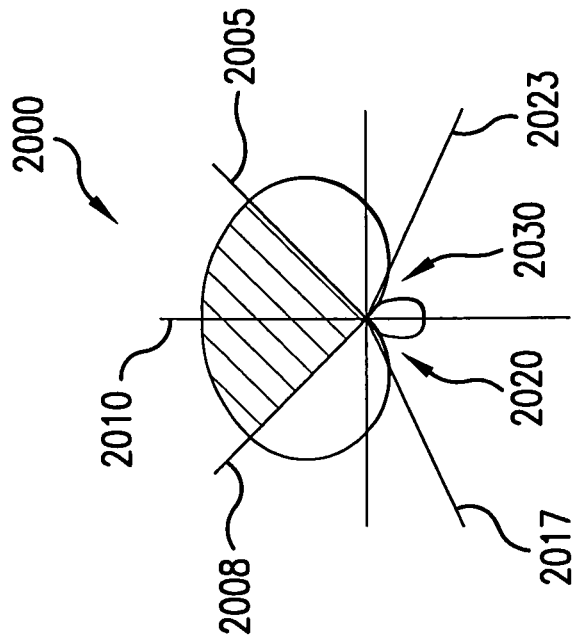
FIG. 20 shows an exemplary polar pattern of a line microphone.

FIG. 20 shows an exemplary polar pattern 2000 for a line microphone. The acceptance angle for polar pattern 2000 spans 90-degrees, measured in a counterclockwise fashion from line 2005 to line 2008. Polar pattern 2000 has a first null 2020 and a second null 2030. First null 2020 and second null 2030 are each 120-degrees from upward-pointing vertical axis 2010, as measured in a counterclockwise and clockwise fashion, respectively.

A uni-directional microphone's ability to reject much of the sound that arrives from off-axis provides a greater working distance or "distance factor" than an omni-directional microphone. Table 1, below, sets forth the acceptance angle, null, and distance factor (DF) for exemplary microphones of differing types. As Table 1 shows, the DF for an exemplary cardioid microphone is 1.7 while the DF for an exemplary omni-directional microphone is 1.0. This means that if an omni-directional microphone is used in a uniformly noisy environment to pick up a desired sound that is 10 feet away, a cardioid microphone used at 17 feet away from the sound source should provide the same results in terms of the ratio of desired signal to ambient noise. Among the other exemplary microphone types listed in Table 1, the subcardioid microphone performs equally well at 12 feet, the hypercardioid at 20 feet, and the line at 25 feet.

TABLE 1

Properties of Exemplary Microphones of Differing Types

| | Omni-directional | Subcardioid | Cardioid | Hypercardioid | Line |
|---|---|---|---|---|---|
| Acceptance Angle | — | 170° | 120° | 100° | 90° |
| Null | None | 100° | 180° | 110° | 120° |
| Distance Factor (DF) | 1.0 | 1.2 | 1.7 | 2.0 | 2.5 |

VIII. Microphone Arrays

A wireless telephone in accordance with an embodiment of the present invention can include at least one microphone array. As will be described in more detail below, a microphone array includes a plurality of microphones that are coupled to a digital signal processor (DSP). The DSP can be configured to adaptively combined the audio signals output by the microphones in the microphone array to effectively adjust the sensitivity of the microphone array to pick up sound waves originating from a particular direction. Some of the information provided below on microphone arrays was found on the following website: <http://www.idiap.ch/~mccowan/arrays/tutorial.pdf>.

In a similar manner to uni-directional microphones, a microphone array can be used to enhance the pick up of sound originating from a particular direction, while tending to reject sound that arrives from other directions. Like uni-directional microphones, the sensitivity of a microphone array can be represented by a polar pattern or a directivity pattern. However, unlike uni-directional microphones, the direction in which a microphone array is most sensitive is not fixed. Rather, it can be dynamically adjusted. That is, the orientation of the main lobe of a polar pattern or directivity pattern of a microphone array can be dynamically adjusted.

A. Background on Microphone Arrays

Figure 21:
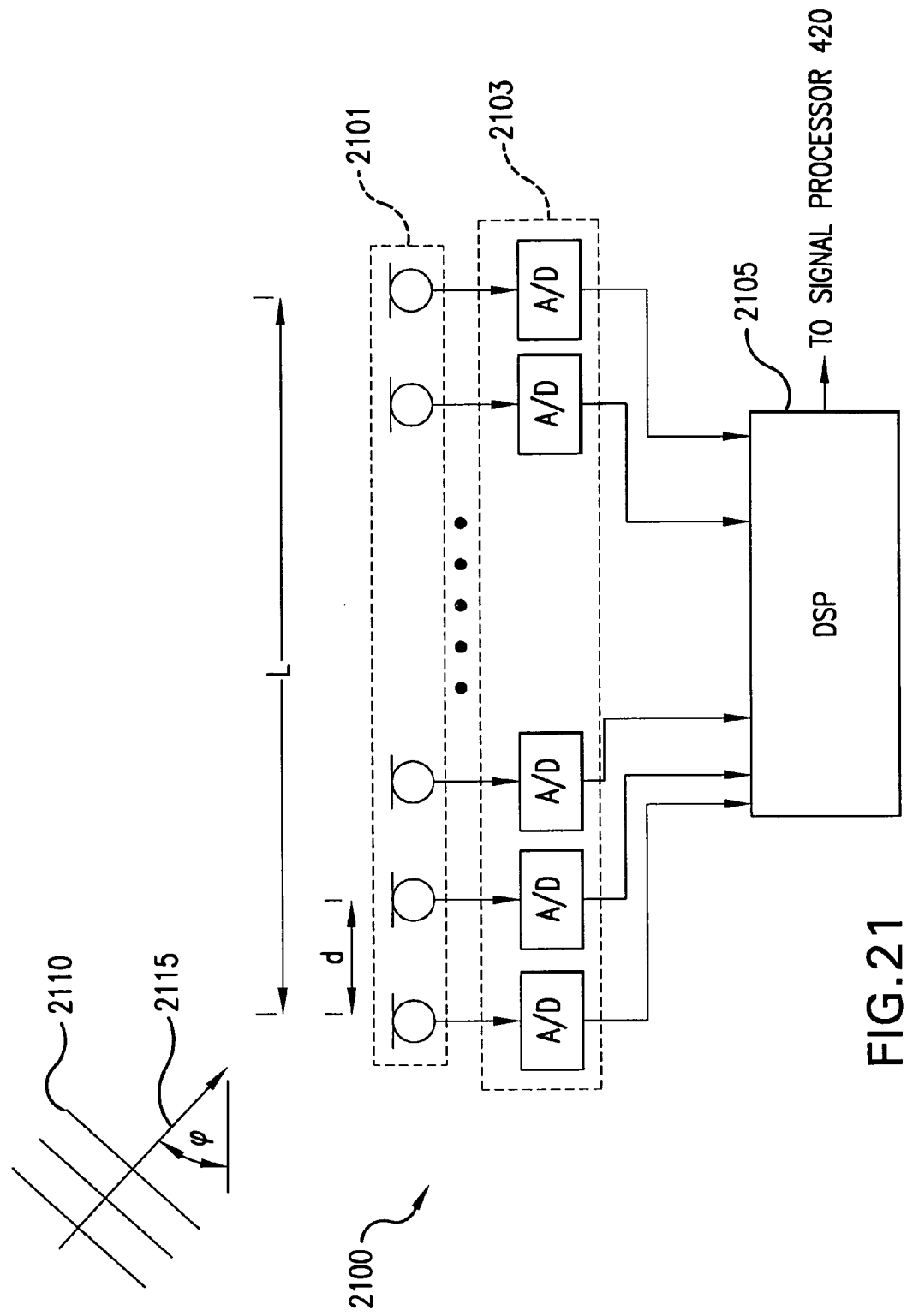
FIG. 21 shows an exemplary microphone array, in accordance with an embodiment of the present invention.

FIG. 21 is a representation of an example microphone array 2100 in accordance with an embodiment of the present invention. Microphone array 2100 includes a plurality of microphones 2101, a plurality of A/D converters 2103 and a digital signal processor (DSP) 2105. Microphones 2101 function to convert a sound wave impinging thereon into audio output signals, in like manner to conventional microphones. A/D converters 2103 receive the analog audio output signals from microphones 2101 and convert these signals to digital form in a manner well-known in the relevant art(s). DSP 2105 receives and combines the digital signals from A/D converters 2103 in a manner to be described below.

Also included in FIG. 21 are characteristic dimensions of microphone array 2100. In an embodiment, microphones 2101 in microphone array 2100 are approximately evenly spaced apart by a distance d. The distance between the first and last microphone in microphone array 2100 is designated as L. The following relationship is satisfied by characteristic dimensions L and d:

$$L=(N-1)d, \qquad \text{Eq. (1)}$$

where N is the number of microphones in the array.

Characteristic dimensions d and/or L impact the response of microphone array 2100. More particularly, the ratio of the total length of microphones 2101 to the wavelength of the impinging sound (i.e., $L/\lambda$) affects the response of microphone array 2100. For example, FIGS. 22A-D show the polar patterns of a microphone array having different values of $L/\lambda$, demonstrating the impact that this ratio has on the microphone array's response.

As can be seen from FIGS. 22A-D, similar to uni-directional microphones, a microphone array has directional properties. In other words, the response of a microphone array to a particular sound source is dependent on the direction of arrival (DOA) of the sound waves emanating from the sound source in relation to the microphone array. The DOA of a sound wave can be understood by referring to FIG. 21. In FIG. 21, sound waves emanating from a sound source are approximated (using the far-field approximation described below) by a set of parallel wavefronts 2110 that propagate toward microphone array 2100 in a direction indicated by arrow 2115. The DOA of parallel wavefronts 2110 can be defined as an angle (p that arrow 2115 makes with the axis along which microphones 2101 lie, as shown in the figure.

In addition to the DOA of a sound wave, the response of a microphone array is affected by the distance a sound source is from the array. Sound waves impinging upon a microphone array can be classified according to a distance, r, these sound waves traveled in relation to the characteristic dimension L and the wavelength of the sound $\lambda$. In particular, if r is greater than $2L^2/\lambda$, then the sound source is classified as a far-field source and the curvature of the wavefronts of the sound waves impinging upon the microphone array can be neglected. If r is not greater than $2L^2/\lambda$, then the sound source is classified as a near-field source and the curvature of the wavefronts can not be neglected.

FIG. 22E shows an exemplary directivity pattern illustrating the response of a microphone array for a near-field source (dotted line) and a far-field source (solid line). In the directivity pattern, the array's response is plotted on the vertical axis and the angular dependence is plotted on the horizontal axis.

In a similar manner to uni-directional microphones, a maximum and a minimum sensitivity angle can be defined for a microphone array. A maximum sensitivity angle of a microphone array is defined as an angle within which a sensitivity of the microphone array is above a predetermined threshold. A minimum sensitivity angle of a microphone array is defined as an angle within which a sensitivity of the microphone array is below a predetermined threshold.

B. Examples of Steering a Response of a Microphone Array

As mentioned above, DSP 2105 of microphone array 2100 can be configured to combine the audio output signals received from microphones 2101 (in a manner to be described presently) to effectively steer the directivity pattern of microphone array 2100.

In general, DSP 2105 receives N audio signals and produces a single audio output signal, where again N is the number of microphones in the microphone array 2100. Each of the N audio signals received by DSP 2105 can be multiplied by a weight factor, having a magnitude and phase, to produce N products of audio signals and weight factors. DSP 2105 can then produce a single audio output signal from the collection of received audio signals by summing the N products of audio signals and weight factors.

By modifying the weight factors before summing the products, DSP 2105 can alter the directivity pattern of microphone array 2100. Various techniques, called beamforming techniques, exist for modifying the weight factors in particular ways. For example, by modifying the amplitude of the weight factors before summing, DSP 2105 can modify the shape of a directivity pattern. As another example, by modifying the phase of the weight factors before summing, DSP 2105 can control the angular location of a main lobe of a directivity pattern of microphone array 2100. FIG. 23 illustrates an example in which the directivity pattern of a microphone array is steered by modifying the phases of the weight factors before summing. As can be seen from FIG. 23, in this example, the main lobe of the directivity pattern is shifted by approximately 45 degrees.

As is well-known in the relevant art(s), beamforming techniques can be non-adaptive or adaptive. Non-adaptive beamforming techniques are not dependent on the data. In other words, non-adaptive beamforming techniques apply the same algorithm regardless of the incoming sound waves and resulting audio signals. In contrast, adaptive beamforming techniques are dependent on the data. Accordingly, adaptive beamforming techniques can be used to adaptively determine a DOA of a sound source and effectively steer the main lobe of a directivity pattern of a microphone array in the DOA of the sound source. Example adaptive beamforming techniques include, but are not limited to, Frost's algorithm, linearly constrained minimum variance algorithms, generalized sidelobe canceller algorithms, or the like.

It is to be appreciated that FIG. 21 is shown for illustrative purposes only, and not limitation. For example, microphones 2101 need not be evenly spaced apart. In addition, microphone array 2100 is shown as a one-dimensional array; however two-dimensional arrays are contemplated within the scope of the present invention. As a person having ordinary skill in the art knows, two-dimensional microphone arrays can be used to determine a DOA of a sound source with respect to two distinct dimensions. In contrast, a one-dimensional array can only detect the DOA with respect to one dimension.

IX. Embodiments Implementing Microphone Arrays

In embodiments to be described below, microphone 201 and/or microphone 202 of wireless telephone 200 (FIGS. 2 and 3) can be replaced with a microphone array, similar to microphone array 2100 shown in FIG. 21.

FIG. 24 is an example transmit path 2400 of a wireless telephone implemented with a first microphone array 201' and a second microphone array 202'. First microphone array 201' and second microphone array 202' function in like manner to exemplary microphone array 2100 (FIG. 21) described above. In particular, microphones 2401*a-n* and 2411*a-n* function to convert sound waves impinging thereon into audio signals. A/D converters 2402*a-n* and 2412*a-n* function to convert the analog audio signals received from microphones 2401*a-n* and 2411*a-n*, respectively, into digital audio signals. DSP 2405 receives the digital audio signals from A/D converters 2402*a-n* and combines them to produce a first audio output signal that is sent to signal processor 420'. Similarly, DSP 2415 receives the digital audio signals from A/D converters 2412*a-n* and combines them to produce a second audio output signal that is sent to signal processor 420'.

The remaining components in transmit path 2400 (namely, signal processor 420', speech encoder 404', channel encoder 405', modulator 406', RF module 407' and antenna 408') function in substantially the same manner as the corresponding components discussed with reference to FIG. 4. Accordingly, the functionality of the remaining components is not discussed further.

In an embodiment of the present invention, DSP 2405, using adaptive beamforming techniques, determines a DOA of a voice of a user of a wireless telephone based on the digital audio signals received from A/D converters 2402*a-n*. DSP 2405 then adaptively combines the digital audio signals to effectively steer a maximum sensitivity angle of microphone array 201' so that the mouth of the user is within the maximum sensitivity angle. In this way, the single audio signal output by DSP 2405 will tend to include a cleaner version of the user's voice, as compared to an audio signal output from a single microphone (e.g., microphone 201). The audio signal output by DSP 2405 is then received by signal processor 420' and processed in like manner to the audio signal output by microphone 201 (FIG. 4), which is described in detail above.

In another embodiment of the present invention, DSP 2415 receives the digital audio signals from A/D converters 2412*a-n* and, using adaptive beamforming techniques, determines a DOA of a voice of a user of the wireless telephone based on the digital audio signals. DSP 2415 then adaptively combines the digital audio signals to effectively steer a minimum sensitivity angle of microphone array 202' so that the mouth of the user is within the minimum sensitivity angle. In this way, the single audio signal output by DSP 2415 will tend to not include the user's voice; hence the output of DSP 2415 will tend to include a purer version of background noise, as compared to an audio signal output from a single microphone (e.g., microphone 202). The audio signal output by DSP 2415 is then received by signal processor 420' and processed in like manner to the audio signal output by microphone 202 (FIG. 4), which is described in detail above.

In most situations background noise is non-directional—it is substantially the same in all directions. However, in some situations a single noise source (e.g., a jackhammer or ambulance) accounts for a majority of the background noise. In these situations, the background noise is highly directional. In an embodiment of the invention, DSP 2405 is configured to determine a DOA of a highly directional background noise source. DSP 2405 is further configured to adaptively combine the digital audio signals to effectively steer a minimum sensitivity angle of microphone array 201' so that the highly directional background noise source is within the minimum sensitivity angle. In this way, microphone array 201' will tend to reject sound originating from the DOA of the highly directional background noise source. Hence, microphone array 201' will consequently pick up a purer version of a user's voice, as compared to a single microphone (e.g., microphone 201).

In another embodiment, DSP 2415 is configured to determine a DOA of a highly directional background noise source. DSP 2415 is further configured to adaptively combine the digital audio signals from A/D converters 2412$a$-$n$ to effectively steer a maximum sensitivity angle of microphone array 202' so that the highly directional background noise source is within the maximum sensitivity angle. In this way, microphone array 202' will tend to pick-up sound originating from the DOA of the highly directional background noise source. Hence, microphone array 202' will consequently pick up a purer version of the highly directional background noise, as compared to a single microphone (e.g., microphone 202).

In a further embodiment (not shown), a wireless telephone includes a first and second microphone array and a VAD. In this embodiment, a DSP is configured to determine a DOA of a highly directional background noise and a DOA of a user's voice. In addition, in a similar fashion to that described above, the VAD detects time intervals in which a voice component is present in the audio signal output by the first microphone array. During time intervals in which a voice signal is present in the audio signal output from the first microphone array, a DSP associated with the second microphone array adaptively steers a minimum sensitivity angle of the second microphone array so that the mouth of the user is within the minimum sensitivity angle. During time intervals in which a voice signal is not present in the audio signal output from the first microphone array, a DSP associated with the second microphone array adaptively steers a maximum sensitivity angle of the second microphone array so that the highly directional background noise source is within the maximum sensitivity angle. In other words, the second microphone array, with the help of the VAD, adaptively switches between the following: (i) rejecting the user's voice during time intervals in which the user is talking; and (ii) preferentially picking up a highly directional background noise sound during time intervals in which the user is not talking. In this way, the second microphone array can pick up a purer version of background noise as compared to a single microphone.

It is to be appreciated that the embodiments described above are meant for illustrative purposes only, and not limitation. In particular, it is to be appreciated that the term "digital signal processor," "signal processor" or "DSP" used above and below can mean a single DSP, multiple DSPs, a single DSP algorithm, multiple DSP algorithms, or combinations thereof. For example, DSP 2405, DSP 2415 and/or signal processor 420' (FIG. 24) can represent different DSP algorithms that function within a single DSP. Additionally or alternatively, various combinations of DSP 2405, DSP 2415 and/or signal processor 420' can be implemented in a single DSP or multiple DSPs as is known by a person skilled in the relevant art(s).

X. Multiple Description Transmission System in Accordance with an Embodiment of the Present Invention FIG. 25 illustrates a multiple description transmission system 2500 that provides redundancy to combat transmission channel impairments in accordance with embodiments of the present invention. Multiple description transmission system 2500 includes a first wireless telephone 2510 and a second wireless telephone 2520. First wireless telephone 2510 transmits multiple versions 2550 of a voice signal to second wireless telephone 2520.

FIG. 26 is a functional block diagram illustrating an example transmit path 2600 of first wireless telephone 2510 and an example receive path 2650 of second wireless telephone 2520. As shown in FIG. 26, first wireless telephone 2510 comprises an array of microphones 2610, an encoder 2620, and a transmitter 2630. Each microphone in microphone array 2610 is configured to receive voice input from a user (in the form of a sound pressure wave) and to produce a voice signal corresponding thereto. Microphone array 2610 can be, for example, substantially the same as microphone array 2100 (FIG. 21). Encoder 2620 is coupled to microphone array 2610 and configured to encode each of the voice signals. Encoder 2620 can include, for example, a speech encoder and channel encoder similar to speech encoder 404 and channel encoder 405, respectively, which are each described above with reference to FIG. 4. Additionally, encoder 2620 may optionally include a DSP, similar to DSP 420 (FIG. 4).

Transmitter 2630 is coupled to encoder 2620 and configured to transmit each of the encoded voice signals. For example, FIG. 25 conceptually illustrates an example multiple description transmission system. In FIG. 25, first wireless telephone 2510 transmits a first signal 2550A and a second signal 2550B to second wireless telephone 2520. It is to be appreciated, however, that first wireless telephone 2510 can transmit more than two signals (e.g., three, four, five, etc.) to second wireless telephone 2520. Transmitter 2630 of first wireless telephone 2510 can include, for example, a modulator, an RF module, and an antenna similar to modulator 406, RF module 407, and antenna 408, respectively, which, as described above with reference to FIG. 4, collectively function to transmit encoded voice signals.

In alternative embodiments, first wireless telephone 2510 can include multiple encoders and transmitters. For instance, first wireless telephone 2510 can include multiple transmit paths similar to transmit path 100 (FIG. 1A), where each transmit path corresponds to a single microphone of microphone array 2610 of first wireless telephone 2510.

As shown in receive path 2650 of FIG. 26, second wireless telephone 2520 comprises a receiver 2660, a decoder 2670, and a speaker 2680. Receiver 2660 is configured to receive transmitted signals 2550 (FIG. 25). For example, receiver 2660 can include an antenna, an RF module, and a demodulator similar to antenna 128, RF module 127, and demodulator 126, respectively, which, as described above with reference to FIG. 1B, collectively function to receive transmitted signals. Decoder 2670 is coupled to receiver 2660 and configured to decode the signals received by receiver 2660, thereby producing an output signal. For example, decoder 2670 can include a channel decoder and speech decoder similar to channel decoder 125 and speech decoder 124, respectively, which, as described above with reference to FIG. 1B, collectively function to decode a received signal. Additionally, decoder 2670 may optionally include a DSP. Speaker 2680 receives the output signal from decoder 2670 and produces a pressure sound wave corresponding thereto. For example, speaker 2680 can be similar to speaker 129 (FIG. 1B). Additionally, a power amplifier (not shown) can be included before speaker 2680 (or speaker 129) to amplify the output signal before it is sent to speaker 2680 (speaker 129) as would be apparent to a person skilled in the relevant art(s).

In a first embodiment of the present invention, decoder 2670 is further configured to perform two functions: (i) time-align the signals received by receiver 2660, and (ii) combine the time-aligned signals to produce the output signal. As is apparent from FIG. 21, due to the spatial separation of the microphones in a microphone array, a sound wave emanating from the mouth of a user may impinge upon each microphone in the array at different times. For example, with reference to FIG. 21, parallel wave fronts 2110 will impinge upon the left-most microphone of microphone array 2100 before it impinges upon the microphone separated by a distance d from the left-most microphone. Since there can be a time-delay with respect to when the sound waves impinge upon the respective microphones in microphone array 2610, there will be a corresponding time-delay with respect to the audio signals output by the respective microphones. Decoder 2670 of second wireless telephone 2520 can compensate for this time-delay by time-aligning the audio signals.

For example, FIG. 27 shows a first audio signal S1 and a second audio signal S2 corresponding to the output of a first and second microphone, respectively, of first wireless telephone 2510. Due to the relative location of the microphones on first wireless telephone 2510, second audio signal S2 is time-delayed by an amount t1 compared to first audio signal S1. Decoder 2670 of second wireless telephone 2520 can be configured to time-align first audio signal S1 and second audio signal S2, for example, by time-delaying first audio signal S1 by an amount equal to t1.

As mentioned above, according to the first embodiment, decoder 2670 of second wireless telephone 2520 is further configured to combine the time-aligned audio signals. Since the respective voice components of first audio signal S1 and second audio signal S2 are presumably nearly identical but the respective noise components in each audio signal are not, the voice components will tend to add-up in phase, whereas the noise components, in general, will not. In this way, by combining the audio signals after time-alignment, the combined output signal will have a higher signal-to-noise ratio than either first audio signal S1 or second audio signal S2.

In a second embodiment of the present invention, decoder 2670 of second wireless telephone 2520 is configured to perform the following functions. First, decoder 2670 is configured to detect a direction of arrival (DOA) of a sound wave emanating from the mouth of a user of first wireless telephone 2510 based on transmitted signals 2550 received by receiver 2660 of second wireless telephone 2520. Decoder 2670 can determine the DOA of the sound wave in a similar manner to that described above with reference to FIGS. 21 through 24.

Second, decoder 2670, which as mentioned above may optionally include a DSP, is configured to adaptively combine the received signals based on the DOA to produce the output signal. By adaptively combining the received signals based on the DOA, decoder 2670 of second wireless telephone 2520 can effectively steer a maximum sensitivity angle of microphone array 2610 of first wireless telephone 2510 so that the mouth of the user of first wireless telephone 2510 is within the maximum sensitivity angle. As defined above, the maximum sensitivity angle is an angle within which a sensitivity of microphone array 2610 is above a threshold.

In a third embodiment of the present invention, for each voice frame of the signals received by receiver 2660, decoder 2670 of second wireless telephone 2520 is configured to perform the following functions. First, decoder 2670 is configured to estimate channel impairments (e.g., bit errors and frame loss). That is, decoder 2670 is configured to determine the degree of channel impairments for each voice frame of the received signals. For example, for a given frame, decoder 2670 can estimate whether the channel impairments exceed a threshold. The estimate can be based on signal-to-noise ratio (S/N) or carrier-to-interference ratio (C/I) of a channel, the bit error rate, block error rate, frame error rate, and or the like.

Second, decoder 2670 is configured to decode a received signal with the least channel impairments, thereby producing the output signal for the respective voice frames.

By adaptively decoding the signal with the least channel impairments for the respective voice frames, decoder 2670 is configured to decode the best signal for a given time. That is, at different times the multiple versions 2550 of the voice signal transmitted by first wireless telephone 2510 may be subject to different channel impairments. For example, for a given voice frame, first signal 2550A may have less channel impairments than second signal 2550B. During this voice frame, decoding first signal 2550A may lead to a cleaner and better quality voice signal. However, during a subsequent voice frame, first signal 2550A may have more channel impairments than second signal 2550B. During this subsequent voice frame, decoding second signal 2550B may lead to a cleaner and better quality voice signal.

In a fourth embodiment of the present invention, for each voice frame of the signals received by receiver 2660, decoder 2670 is configured to estimate channel impairments and dynamically discard those received signals having a channel impairment worse than a threshold. Then, decoder 2670 is further configured to combine the non-discarded received signals according to either the first or second embodiment described above. That is, decoder 2670 can be configured to time-align and combine the non-discarded received signals in accordance with the first embodiment. Alternatively, decoder 2670 can be configured to combine the non-discarded received signals to effectively steer microphone array 2610 of first wireless telephone 2510 in accordance with the second embodiment.

In a fifth embodiment of the present invention, encoder 2620 of first wireless telephone 2510 is configured to encode the voice signals at different bit rates. For example, encoder 2620 can be configured to encode one of the voice signals at a first bit rate ("a main channel") and each of the other voice signals at a bit rate different from the first bit rate ("auxiliary channels"). The main channel can be encoded and transmitted, for example, at the same bit rate as a conventional single-channel wireless telephone (e.g., 22 kilobits per second); whereas the auxiliary channels can be encoded and transmitted, for example, at a bit rate lower than a conventional single-channel wireless telephone (e.g., 8 kilobits per second or 4 kilobits per second). In addition, different ones of the auxiliary channels can be encoded and transmitted at different bit rates. For example, a first of the auxiliary channels can be encoded and transmitted at 8 kilobits per second; whereas a second and third auxiliary channel can be encoded and transmitted at 4 kilobits per second. Decoder 2670 of second wireless telephone 2520 then decodes the main and auxiliary channels according to one of the following two examples.

In a first example, for each voice frame of the transmitted signals, decoder 2670 of second wireless telephone 2520 is configured to estimate channel impairments. A channel is corrupted if the estimated channel impairments for that channel exceed a threshold. If (i) the main channel is corrupted by channel impairments, and if (ii) at least one of the auxiliary channels is not corrupted by channel impairments, then the decoder is configured to decode one of the auxiliary channels to produce the output signal.

In a second example, decoder 2670 uses the main channel and one of the auxiliary channels to improve the performance of a frame erasure concealment algorithm. Frame erasure occurs if the degree of channel impairments in a given voice frame exceeds a predetermined threshold. Rather than output no signal during a voice frame that has been erased, which would result in no sound during that voice frame, some decoders employ a frame erasure concealment algorithm to conceal the occurrence of an erased frame. A frame erasure concealment algorithm attempts to fill the gap in sound by extrapolating a waveform for the erased frame based on the waveform that occurred before the erased frame. Some frame erasure concealment algorithms use the side information (e.g., predictor coefficients, pitch period, gain, etc.) to guide the waveform extrapolation in order to successfully conceal erased frames. An example frame erasure concealment algorithm is disclosed in U.S. patent application Ser. No. 10/968,300 to Thyssen et al., entitled "Method For Packet Loss And/Or Frame Erasure Concealment In A Voice Communication System," filed Oct. 20, 2004, the entirety of which is incorporated by reference herein.

In this second example, for each voice frame of the transmitted signals, decoder 2670 is configured to estimate channel impairments. If (i) the side information of the main channel is corrupted, and if (ii) the corresponding side information of at least some of the auxiliary channels channel is not corrupted, then decoder 2670 is configured to use both the main channel and one of the auxiliary channels to improve performance of a frame erasure concealment algorithm in the production of the output signal. By using uncorrupted side information from one of the auxiliary channels, the frame erasure concealment algorithm can more effectively conceal an erased frame.

XI. Conclusion

The specifications and the drawings used in the foregoing description were meant for exemplary purposes only, and not limitation. It is intended that the full scope and spirit of the present invention be determined by the claims that follow.

What is claimed is:

1. A wireless telephone, comprising:
a receiver configured to receive multiple versions of a voice signal from a second wireless telephone via a communications link between the wireless telephone and the second wireless telephone, each version being produced from a microphone in a microphone array of the second wireless telephone;
a decoder coupled to the receiver and configured to decode the multiple versions of the voice signal to produce an output signal, wherein for each voice frame of the multiple versions of the voice signal, the decoder is further configured to estimate channel impairments caused by transmission via the communications link and decode one of the multiple versions of the voice signal with the least channel impairments, whereby the decoded version is used as the output signal for the respective voice frames; and
a speaker configured to receive the output signal and produce a sound pressure wave corresponding thereto.

2. The wireless telephone of claim 1, wherein the decoder is further configured to time-align the multiple versions of the voice signal and to combine the time-aligned versions to produce the output signal, whereby the output signal has a higher signal-to-noise ratio than any of the multiple versions of the voice signal.

3. The wireless telephone of claim 1, wherein:
the decoder is further configured to detect a direction of arrival (DOA) of a sound wave emanating from the mouth of a user of the second wireless telephone based on the multiple versions of the voice signal and to adaptively combine the multiple versions based on the DOA to produce the output signal; and
the decoder is still further configured to adaptively combine the multiple versions based on the DOA to effectively steer a maximum sensitivity angle of the microphone array of the second wireless telephone so that the mouth of the user of the second wireless telephone is within the maximum sensitivity angle, wherein the maximum sensitivity angle is defined as an angle within which a sensitivity of the microphone array is above a threshold.

4. A wireless telephone, comprising:
a receiver configured to receive multiple versions of a voice signal from a second wireless telephone via a communications link between the wireless telephone and the second wireless telephone, each version being produced from a microphone in a microphone array of the second wireless telephone;
a decoder coupled to the receiver and configured to decode the multiple versions of the voice signal to produce an output signal, wherein for each voice frame of the multiple versions of the voice signals, the decoder is further configured to set a threshold of channel impairments caused by transmission via the communications link and dynamically discard at least one of the multiple versions of the voice signal having a channel impairment worse than the threshold; and
a speaker configured to receive the output signal and produce a sound pressure wave corresponding thereto.

5. The wireless telephone of claim 4, wherein:
the decoder is further configured to detect a direction of arrival (DOA) of a sound wave emanating from the mouth of a user of the second wireless telephone based on the voice frames of the non-discarded versions of the voice signal and to adaptively combine the voice frames of the non-discarded versions based on the DOA to produce the output signal; and
the decoder is further configured to adaptively combine the voice frames of the non-discarded versions based on the DOA to effectively steer a maximum sensitivity angle of the microphone array of the second wireless telephone so that the mouth of the user of the second wireless telephone is within the maximum sensitivity angle, wherein the maximum sensitivity angle is defined as an angle within which a sensitivity of the microphone array is above a threshold.

6. The wireless telephone of claim 4, wherein the decoder is further configured to time-align and combine the received signals of the non-discarded versions of the voice signal to produce the output signal, whereby the output signal has a higher signal-to-noise ratio than any of the multiple versions of the voice signal received by the receiver.

7. A wireless telephone, comprising:
a receiver configured to receive multiple versions of a voice signal from a second wireless telephone via a communications link between the wireless telephone and the second wireless telephone, each version being produced from a microphone in a microphone array of the second wireless telephone;
a decoder coupled to the receiver and configured to decode the multiple versions of the voice signal to produce an output signal, wherein the multiple versions of the voice signal have been encoded and transmitted at different bit rates by the second wireless telephone, and wherein for each voice frame of the multiple versions of the voice signal received by the receiver, the decoder is further configured to estimate channel impairments caused by transmission via the communications link; and
a speaker configured to receive the output signal and produce a sound pressure wave corresponding thereto.

8. The wireless telephone of claim 7, wherein:
one of the versions of the voice signal has been encoded and transmitted over a main channel at a first bit rate, and each other version has been encoded and transmitted over a corresponding auxiliary channel at a bit rate different than the first bit rate; and
if (i) the main channel is corrupted by channel impairments, and (ii) at least one auxiliary channel is not corrupted by channel impairments, the decoder is configured to decode an auxiliary channel to produce the output signal.

9. The wireless telephone of claim 7, wherein:
one of the versions of the voice signal has been encoded and transmitted over a main channel at a first bit rate, and each other version has been encoded and transmitted over a corresponding auxiliary channel at a bit rate different than the first bit rate; and
if (i) side information corresponding to the main channel is corrupted by channel impairments, and (ii) side information corresponding to at least one auxiliary channel is not corrupted, the decoder is configured to use both the main channel and the at least one auxiliary channel to improve performance of a frame erasure concealment algorithm in the production of the output signal.

10. A multiple-description wireless-communication transmission system, comprising:
a first wireless telephone comprising:
an array of microphones, each microphone in the array configured to receive voice input from a user and to produce a voice signal corresponding thereto, thereby providing a plurality of voice signals,
an encoder coupled to the array of microphones and configured to encode each of the plurality of voice signals to provide a plurality of encoded voice signals, and
a transmitter coupled to the encoder and configured to transmit each of the plurality of encoded voice signals to provide a plurality of transmitted signals; and
a second wireless telephone comprising:
a receiver configured to receive the plurality of transmitted signals via a communications link,
a decoder coupled to the receiver and configured to decode the plurality of signals received by the receiver, thereby producing an output signal, wherein for each voice frame of the plurality of signals received by the receiver, the decoder is further configured to estimate channel impairments caused by transmission of the plurality of transmitted signals between the first and second wireless telephones via the communications link and decode one of the plurality of signals received by the receiver with the least channel impairments, thereby producing the output signal for the respective voice frames, and
a speaker configured to receive the output signal and produce a sound pressure wave corresponding thereto.

11. The system of claim 10, wherein the decoder is further configured to time-align the signals received by the receiver and to combine the time-aligned signals to produce the output signal, whereby the output signal has a higher signal-to-noise ratio than any of the transmitted signals received by the receiver.

12. The system of claim 10, wherein:
the decoder is further configured to (i) detect a direction of arrival (DOA) of a sound wave emanating from the mouth of a user of the first wireless telephone based on the signals received by the receiver of the second wireless telephone and (ii) adaptively combine the received signals based on the DOA to produce the output signal; and
the decoder is still further configured to adaptively combine the received signals based on the DOA to effectively steer a maximum sensitivity angle of the microphone array of the first wireless telephone so that the mouth of the user of the first wireless telephone is within the maximum sensitivity angle, wherein the maximum sensitivity angle is defined as an angle within which a sensitivity of the microphone array is above a threshold.

13. A multiple-description wireless-communication transmission system, comprising:
a first wireless telephone comprising
an array of microphones, each microphone in the array configured to receive voice input from a user and to produce a voice signal corresponding thereto, thereby providing a plurality of voice signals,
an encoder coupled to the array of microphones and configured to encode each of the plurality of voice signals to provide a plurality of encoded voice signals, and
a transmitter coupled to the encoder and configured to transmit each of the plurality of encoded voice signals to provide a plurality of transmitted signals; and
a second wireless telephone comprising:
a receiver configured to receive the plurality of transmitted signals via a communications link,
a decoder coupled to the receiver and configured to decode the plurality of signals received by the receiver, thereby producing an output signal, wherein for each voice frame of the plurality of signals received by the receiver, the decoder is further configured to estimate channel impairments caused by transmission of the signals between the first and second wireless telephones via the communications link and dynamically discard at least one of the plurality of received signals having a channel impairment worse than a threshold; and
a speaker configured to receive the output signal and produce a sound pressure wave corresponding thereto.

14. The system of claim 13, wherein the decoder is further configured to detect a direction of arrival (DOA) of a sound wave emanating from the mouth of a user of the first wireless telephone based on the voice frames of the non-discarded signals and to adaptively combine the voice frames of the non-discarded signals based on the DOA to produce the output signal; and
the decoder is still further configured to adaptively combine the voice frames of the non-discarded signals based on the DOA to effectively steer a maximum sensitivity angle of the microphone array of the first wireless telephone so that the mouth of the user of the first wireless telephone is within the maximum sensitivity angle, wherein the maximum sensitivity angle is defined as an angle within which a sensitivity of the microphone array is above a threshold.

15. The system of claim 13, wherein the decoder is further configured to time-align and combine the voice frames of the non-discarded signals to produce the output signal, whereby the output signal has a higher signal-to-noise ratio than any of the transmitted signals received by the receiver.

16. A multiple-description wireless-communication transmission system, comprising:
- a first wireless telephone comprising:
  - an array of microphones, each microphone in the array configured to receive voice input from a user and to produce a voice signal corresponding thereto, thereby providing a plurality of voice signals,
  - an encoder coupled to the array of microphones and configured to encode each of the plurality of voice signals to provide a plurality of encoded voice signals, wherein the encoder is configured to encode one of the voice signals at a first bit rate for transmission over a main channel and each other voice signal at a bit rate different from the first bit rate for transmission over a corresponding auxiliary channel, and
  - a transmitter coupled to the encoder and configured to transmit each of the plurality of encoded voice signals to provide a plurality of transmitted signals; and
- a second wireless telephone comprising:
  - a receiver configured to receive the plurality of transmitted signals via a communications link,
  - a decoder coupled to the receiver and configured to decode the plurality of signals received by the receiver, thereby producing an output signal, wherein for each voice frame of the plurality signals received by the receiver, the decoder is further configured to estimate channel impairments caused by transmission of the signals between the first and second wireless telephones via the communications link;
  - a speaker configured to receive the output signal and produce a sound pressure wave corresponding thereto.

17. The system of claim 16, wherein if (i) the main channel is corrupted by channel impairments, and (ii) at least one auxiliary channel is not corrupted by channels impairments, the decoder is configured to decode an auxiliary channel.

18. The system of claim 16, wherein if (i) side information corresponding to the main channel is corrupted by channel impairments, and (ii) side information corresponding to at least one auxiliary channel is not corrupted by channel impairments, the decoder is configured to use both the main channel and one of the auxiliary channels to improve performance of a frame erasure concealment algorithm in the production of the output signal.

* * * * *